US008977232B2

(12) United States Patent
Vanderveen et al.

(10) Patent No.: US 8,977,232 B2
(45) Date of Patent: Mar. 10, 2015

(54) CERTIFIED DEVICE-BASED ACCOUNTING

(75) Inventors: Michaela Vanderveen, Tracy, CA (US); Arthur Stephens, Hazlet, NJ (US); Vincent D. Park, Budd Lake, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 454 days.

(21) Appl. No.: 12/362,203

(22) Filed: Jan. 29, 2009

(65) Prior Publication Data
US 2010/0190469 A1    Jul. 29, 2010

(51) Int. Cl.
*H04M 11/00* (2006.01)
*H04L 12/14* (2006.01)
*H04L 29/06* (2006.01)
*H04M 15/00* (2006.01)
*H04M 15/28* (2006.01)
*H04M 15/30* (2006.01)
(Continued)

(52) U.S. Cl.
CPC ............ *H04L 12/1403* (2013.01); *H04L 12/14* (2013.01); *H04L 63/0823* (2013.01); *H04L 63/126* (2013.01); *H04M 15/00* (2013.01); *H04M 15/28* (2013.01); *H04M 15/30* (2013.01); *H04M 15/31* (2013.01); *H04M 15/48* (2013.01); *H04W 4/24* (2013.01); *H04W 4/26* (2013.01); *H04W 12/12* (2013.01); *H04M 2215/0156* (2013.01); *H04M 2215/96* (2013.01); *H04W 12/06* (2013.01)
USPC ........ 455/406; 455/410; 455/412.2; 370/252; 709/229

(58) Field of Classification Search
USPC ...................... 455/405–406, 421, 410, 412.2; 711/125, 123, 120; 709/229; 370/252, 370/352, 467, 254, 328; 705/40
See application file for complete search history.

(56) References Cited

U.S. PATENT DOCUMENTS 5,867,494 A * 2/1999 Krishnaswamy et al. .... 370/352
6,466,660 B1 * 10/2002 Merriam ....................... 379/126
(Continued)

FOREIGN PATENT DOCUMENTS

CN    1700784 A    11/2005
CN    1947408 A     4/2007
(Continued)

OTHER PUBLICATIONS

International Search Report and Written Opinion—PCT/US2010/022453—International Search Authority, European Patent Office, Mar. 26, 2010.
(Continued)

*Primary Examiner* — Mahendra Patel
(74) *Attorney, Agent, or Firm* — James K. O'Hare

(57) ABSTRACT

Providing for secure tracking and reporting of wireless resources utilized by a mobile device is described herein. By way of example, resources utilized in conjunction with network-facilitated or peer-to-peer wireless data exchange can be tracked in secure, tamper-resistant components of the mobile device. Further, a report can be compiled from the tracked information and digitally signed with a secret data/material specific to the mobile device. The signed report can be submitted to a network server in conjunction with accounting, billing or like functions. By validating the signature of a mobile device, the network server can trust that information collected and submitted by user devices has not been tampered with or spoofed with an ID of another such device.

50 Claims, 14 Drawing Sheets

(51) Int. Cl.
*H04W 4/24* (2009.01)
*H04W 4/26* (2009.01)
*H04W 12/12* (2009.01)
*H04W 12/06* (2009.01)

(56) References Cited

U.S. PATENT DOCUMENTS

| | | |
|---|---|---|
| 6,745,011 B1 | 6/2004 | Hendrickson et al. |
| 7,634,251 B2 * | 12/2009 | Tseitlin et al. ............... 455/406 |
| 2002/0029197 A1 * | 3/2002 | Kailamaki et al. ............. 705/40 |
| 2002/0078194 A1 * | 6/2002 | Neti et al. ..................... 709/224 |
| 2003/0051041 A1 * | 3/2003 | Kalavade et al. ............. 709/229 |
| 2003/0154174 A1 * | 8/2003 | Tassel et al. .................. 705/412 |
| 2004/0087339 A1 * | 5/2004 | Goldthwaite et al. ........ 455/558 |
| 2004/0246908 A1 * | 12/2004 | Guion et al. .................. 370/252 |
| 2005/0152396 A1 * | 7/2005 | Pichna et al. ................. 370/467 |
| 2007/0032230 A1 * | 2/2007 | Pregont ......................... 455/421 |
| 2010/0191576 A1 * | 7/2010 | Raleigh ........................... 705/10 |

FOREIGN PATENT DOCUMENTS

| | | |
|---|---|---|
| JP | 2006333449 A | 12/2006 |
| JP | 2007528162 A | 10/2007 |
| WO | WO0199400 A2 | 12/2001 |
| WO | 0217612 A2 | 2/2002 |
| WO | WO03034684 A1 | 4/2003 |
| WO | WO03094562 A1 | 11/2003 |
| WO | WO2005004456 A1 | 1/2005 |
| WO | WO-2005086468 A1 | 9/2005 |

OTHER PUBLICATIONS

Taiwan Search Report—TW099102650—TIPO—Dec. 7, 2012.

* cited by examiner

CERTIFIED DEVICE-BASED ACCOUNTING

BACKGROUND

I. Field

The following relates generally to wireless communication, and more specifically to providing secure tracking and reporting of resource utilization at a user terminal.

II. Background

Wireless communication systems are widely deployed to provide various types of communication content such as, e.g., voice content, data content, and so on. Typical wireless communication systems can be multiple-access systems capable of supporting communication with multiple users by sharing available system resources (e.g., bandwidth, transmit power). Examples of such multiple-access systems can include code division multiple access (CDMA) systems, time division multiple access (TDMA) systems, frequency division multiple access (FDMA) systems, orthogonal frequency division multiple access (OFDMA) systems, and the like.

Generally, wireless multiple-access communication systems can concurrently support communication for multiple user terminals. Mobile devices respectively can communicate with one or more base stations via transmissions on forward and reverse links. The forward link (or downlink) refers to a communication link from base stations to user terminals, and the reverse link (or uplink) refers to a communication link from user terminals to base stations. Further, communications between user terminals and base stations can be established via single-input single-output (SISO) systems, multiple-input single-output (MISO) systems, multiple-input multiple-output (MIMO) systems, and so forth.

In addition to the foregoing, ad-hoc wireless communication networks enable communication devices to transmit, or receive information while on the move and without the need for traditional base stations. These communication networks can be communicatively coupled to other public or private networks, for example via wired or wireless access points, in order to facilitate transfer of information to and from user terminals. Such ad-hoc communication networks typically include a plurality of access terminals (e.g., mobile communication devices, mobile phones, wireless user terminals), communicating in a peer-to-peer fashion. The communication networks may also include beacon points that emit strong signals to facilitate peer-to-peer communication amongst access terminals; for example, emitted beacons can contain timing information to aid in timing synchronization of such terminals. These beacon points are positioned to provide wide area coverage as respective access terminals travel within and across different coverage areas.

Wireless communication employing the licensed spectrum, whether facilitated directly by a base station, or utilizing ad-hoc communication between user terminals, involves electronic resources provided by owners/licensees/providers of the spectrum. Typically, costs for utilizing those spectra are shared among consumers utilizing the bandwidth, sometimes employing flat rate or per-usage billing platforms, or employing other billing models. Billing helps offset initial investment in the spectra as well as investment in access point network infrastructure (e.g., base stations, base station controllers, beacon points, subscriber management servers, application servers, and so on), and interfaces with circuit-switched and packet-switched core networks for communication services. Accordingly, billing is an important aspect of a service provider's business model.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The subject disclosure provides for securely determining resource utilization usage at a user terminal and providing a report of usage to a network server. The usage report can be certified by a digital signature specific to the user terminal. The certification is utilized by the network server to verify the usage report. For instance, the certification can enable the server to verify that a specific user terminal utilized the reported resources, or that a specific device facilitated consumption of resource data for another such device. Additionally, certification can enable detection of tampering of the report after certification.

Furthermore, the subject specification discloses a mechanism for tracking and reporting peer-to-peer usage of wireless resources and wireless data consumption. Usage reports submitted to the network server based on ad-hoc data exchange can identify an ad-hoc partner, or amount of data associated with such data exchange. Accordingly, the network server can cross-verify reported data submitted by multiple ad-hoc communication partners as an additional cross-check on veracity of reported information.

According to some aspects of the disclosure, a method of accounting for wireless communications is provided. The method can comprise obtaining a reported resource usage submitted by a user terminal (UT), the reported usage is certified with a terminal-specific digital signature. The method can additionally comprise validating the reported usage.

According to one or more other aspects, an apparatus provides accounting for wireless communications. The apparatus can comprise a communication interface that obtains a reported resource usage submitted by a UT; the reported usage is certified with a terminal-specific digital signature. Moreover, the apparatus can comprise a processing circuit that validates the reported usage.

In still other aspects, disclosed is an apparatus that accounts for wireless communications. The apparatus can comprise means for obtaining a reported resource usage submitted by a UT, the reported usage is certified with a terminal-specific digital signature. The apparatus can additionally comprise means for validating the reported usage.

According to at least one further aspect, provided is a processor configured to account for wireless communications. The processor can comprise a first module for obtaining a reported resource usage submitted by a UT, the reported usage is certified with a terminal-specific digital signature. Further, the processor can comprise a second module for validating the reported usage.

In yet other aspects, disclosed is a computer program product comprising a computer-readable medium. The computer-readable medium can comprise a first set of codes for causing a computer to obtain a reported resource usage submitted by a UT, the reported usage is certified with a terminal-specific digital signature. The computer-readable medium can further comprise a second set of codes for causing the computer to validate the reported usage.

According to one or more aspects of the subject disclosure, provided is a method of accounting for remote communications. The method can comprise utilizing a set of resources in conjunction with wireless data exchange. Moreover, the method can comprise transmitting a report of resource usage, the report is certified with a UT-specific digital signature.

In accordance with other aspects, disclosed is a UT configured to account for remote communications. The UT can comprise a processing circuit that utilizes a set of resources in conjunction with wireless data exchange. Further, the UT can comprise an accounting module that compiles and transmits a report of resource usage; the report is certified with a digital signature specific to the UT. Further to the above, the UT can comprise memory that stores a digital certificate associated with the digital signature.

According to additional aspects, provided is an apparatus configured to account for remote communications. The apparatus can comprise means for utilizing a set of resources in conjunction with wireless data exchange. The apparatus can additionally comprise means for transmitting a report of resource usage, the report is certified with a UT-specific digital signature.

Further to the above, provided is a processor configured to account for remote communication. The processor can comprise a first module for utilizing a set of resources in conjunction with wireless data exchange. Further, the processor can comprise a second module configured for transmitting a report of resource usage, the report is certified with a UT-specific digital signature.

In at least one further aspect, disclosed is a computer program product comprising a computer-readable medium. The computer-readable medium can comprise a first set of codes for causing a computer to utilize a set of resources in conjunction with wireless data exchange. The computer-readable medium can further comprise a second set of codes for causing the computer to transmit a report of resource usage, the report is certified with a UT-specific digital signature.

To the accomplishment of the foregoing and related ends, the one or more aspects comprise the features hereinafter fully described and particularly pointed out in the claims. The following description and the annexed drawings set forth in detail certain illustrative aspects of the one or more aspects. These aspects are indicative, however, of but a few of the various ways in which the principles of various aspects can be employed and the described aspects are intended to include all such aspects and their equivalents.

DETAILED DESCRIPTION

Figure 1:
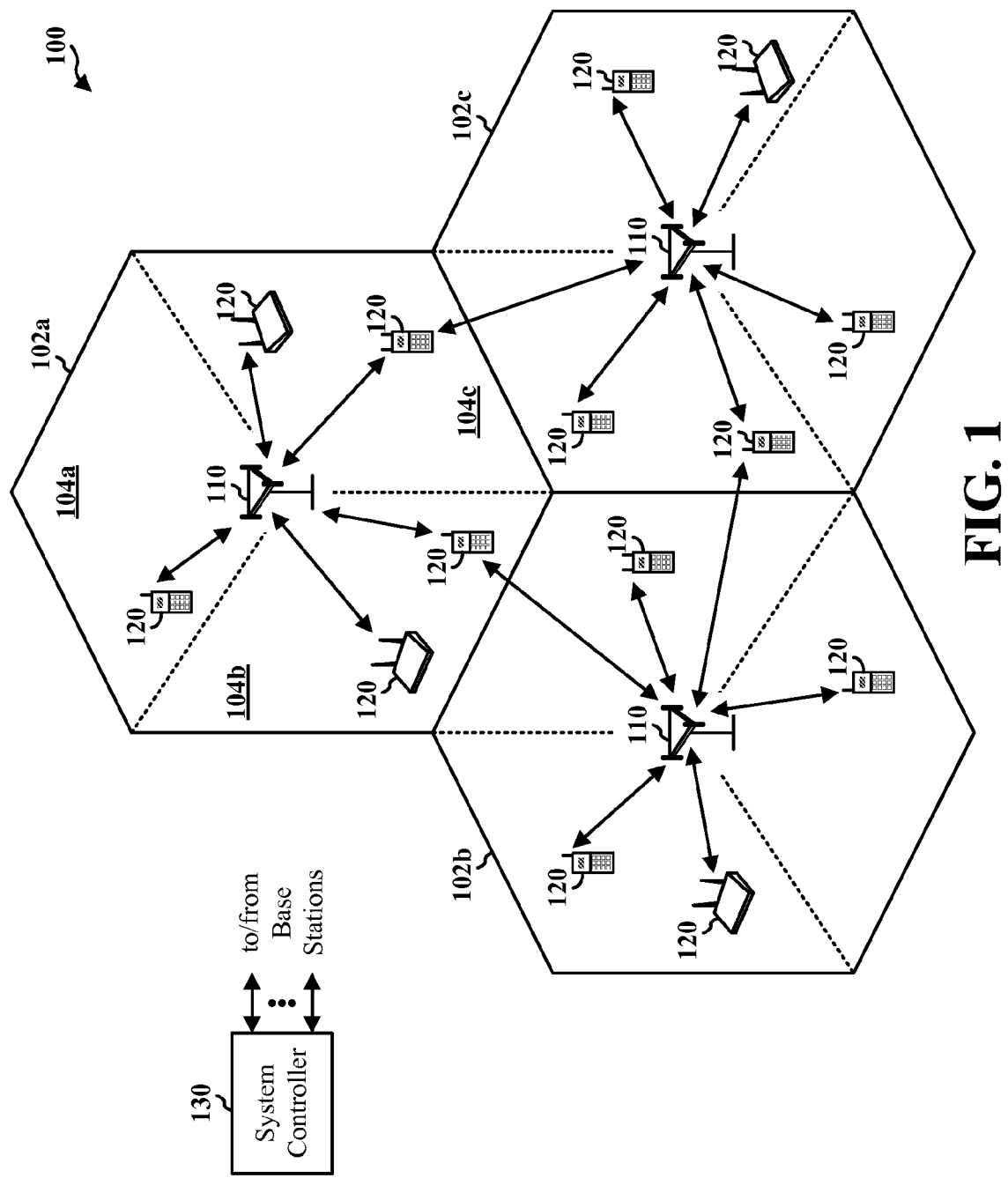
FIG. 1 illustrates a block diagram of an example system that provides wireless communication in accordance with aspects set forth herein.

Various aspects are now described with reference to the drawings, wherein like reference numerals are used to refer to like elements throughout. In the following description, for purposes of explanation, numerous specific details are set forth in order to provide a thorough understanding of one or more aspects. It may be evident, however, that some aspect(s) can be practiced without these specific details. In other instances, well-known structures and devices are shown in block diagram form in order to facilitate describing one or more aspects.

In addition, various aspects of the disclosure are described below. It should be apparent that the teachings herein can be embodied in a wide variety of forms and that any specific structure and/or function disclosed herein is merely representative. Based on the teachings herein one skilled in the art should appreciate that an aspect disclosed herein can be implemented independently of other aspects and that two or more of such aspects can be combined in various manners. For example, an apparatus can be implemented, or a method practiced using any number of the aspects set forth herein. In addition, an apparatus can be implemented, or a method practiced using other structure or functionality in addition to or other than one or more of the aspects set forth herein. As an example, many of the methods, devices, systems and apparatuses described herein are described in the context of providing secure tracking and reporting of wireless resource usage at a terminal device. It should be appreciated that similar techniques could apply to other communication environments.

As wireless communication systems evolve, various forms of communication can be employed including direct wireless interface to network access points, relayed interface to access points (e.g., by way of one or more terminal devices), or ad-hoc communication between user terminals (UTs). If a communication system does not require operator-owned access points, yet makes use of licensed spectrum, there should be a way to enable a spectrum provider to assess a level of usage of airlink resources. The level of usage is typically related to infrastructure and licensing costs, and consequently is useful data for properly pricing services provided to subscribers, or for other management reasons.

In traditional cellular systems where operator-owned access points provide direct or indirect service to communication resources, such access points can determine resource usage levels for subscriber devices. Accordingly, user-related security concerns related to device usage (e.g., based on user error, user fraud, or the like) are mitigated or avoided. For ad-hoc communications, however, the operator controlled access points, if present, have limited capacity to monitor usage levels of surrounding UTs to perform these tracking functions. Specifically, operator-controlled access points are either not needed for or only indirectly involved in ad-hoc communications.

Moreover, some conventional models associated with wireless communications are being displaced. For example, cognitive phones employed for use in licensed and unlicensed spectrums are increasingly being employed. Likewise, peer to peer frameworks for communications are being employed. Consequently, conventional models for tracking use of spectrum bandwidth, services consumed, etc., are becoming inefficient for recouping expenses associated with wireless infrastructure utilized by terminals, let alone monetizing such use. Regardless of the form of communication, a point of relative commonality across wireless communication schemes is use of resources by user terminals.

Accordingly, one manner of addressing the foregoing paradigm shift in communication models is for UTs to conduct periodic, self-reported accounting associated with resource utilization. In this model, devices can report resource usage in conjunction with wireless communications back to a network. Reporting can be conducted periodically, sporadically—based on occurrence of a determined condition, or based on a network reporting trigger, etc., as prescribed in a service agreement, for example—or the like. The report can comprise various data characterizing usage of peer-to-peer or network resources. Thus, for instance, the report can specify a number of data packets received/sent/consumed in communication, number of bytes received/sent/consumed, time spent in an active state, and so on. To this end, a wireless terminal can wait until a connection to the service provider's network is available, and then upload a usage report back to a network accounting server. The accounting server can be operated by the service provider or an affiliated service provider, for instance.

In addition to the foregoing, a UT can be associated with a terminal-specific digital certificate, stored in memory at the mobile terminal. The terminal-specific digital certificate can include or be associated with several parameters. For instance, the parameters can comprise a device identifier for the UT (e.g., a hardware address or universally unique identifier [UUID]), a public key associated with the identifier (e.g., a 64-byte or 2048 bit number), a serial number, and a Certificate Authority (CA) signature. Additionally, the digital certificate can be associated with secret data or material indicative of and private to the specific UT, utilized to generate a digital signature unique or substantially unique to the UT.

The terminal-specific secret data/material can be embedded during manufacturing of such device, in secure hardware, software or a combination thereof for example. Additionally, the secret data/material can be used (e.g., as a private key) to secure the collection of usage data and the compilation of an accounting report and transmission thereof to remote entities, and to facilitate integrity, non-repudiation, and other security goals. For instance, a signature computed using a private key part of a public/private key pair associated with the digital certificate can be utilized by a network accounting server to verify identification (ID) of a submitting terminal as well as integrity of data in the report.

In one aspect, the security measures comprise securing accounting records for accuracy and transmission integrity prior to transmitting the records. For example, a terminal can employ a digital certificate specific to the terminal to digitally sign the accounting records. In one aspect, the process of digital signature involves the terminal employing a key private to the terminal to execute a signature on a hash of the accounting records (e.g., a hash function applied to pertinent accounting data). When the signed records reach an Accounting Server, the Server can verify the records having been collected by the terminal identified by the certificate. In one instance, the Accounting Server receiving the signed records can utilize the terminal's public key to verify the associated message. To this end, the Accounting Server can employ a database of digital certificates (e.g., terminal identifiers and corresponding public keys), or else can validate such certificates in other suitable manners.

An alternative mechanism for achieving the goal of securing and authenticating terminal-initiated accounting records involves a terminal-specific secret data, material, key, etc., that is stored at both the terminal and at a network entity (e.g., the accounting server). This terminal-specific secret data/material/key is referred hereinafter as a shared-secret key. Additionally, it is to be appreciated that the shared-secret key can, according to various aspects, be of a different form from the private key discussed above (e.g., different length, generated from a different function, and so forth) or a similar form. The shared-secret key can be employed in both securing data stored at or transmitted from a terminal, and authenticating data received at a recipient of the transmission.

When employing a shared-secret key, a terminal can generate a message authentication code (MAC) (which also can be referred to as a message integrity code [MIC]). For instance, the MAC can be generated with a keyed one-way hash function, such as an HMAC-MD5 function, or HMAC-SHA1 function, or the like. The MAC (or MIC) can be written onto a report generated and stored in the terminal (e.g., in non-secure memory) or transmitted to an external device (e.g., the accounting server) as a means of securing the data stored in the report.

When the accounting server receives such a transmission, a corresponding version of the MAC is generated by the server, using the same shared-secret key and keyed one-way hash function. The MAC can be compared with the MAC written onto the report by the terminal. If the comparison is a match, the accounting server can infer that the report is both initiated by the particular terminal and not tampered with, and authenticate the report. If the comparison is not a match, the accounting server can infer that the report is not authentic. Results of the comparison based on the shared-secret key are referred to as digital authentication. Digital authentication therefore, as utilized herein (and in contrast to a digital signature), refers to a shared-secret key (or other suitable data/material) employed by both the terminal and the accounting server in securing transmitted data and verifying the integrity of received data, respectively. It should be appreciated that where digital signature or digitally signing is referred to herein for securing or verifying data, digital authentication can be employed as an alternative to or in addition to digital signature, unless otherwise clear from pertinent context.

A wireless communication accounting record, as described herein, can reflect usage of licensed spectra quantified in a variety of ways. For example, total number of IP (Internet Protocol) data packets exchanged by the terminal during a certain period, total number of bytes consumed, sent or received in a certain period, duration of time the terminal is "active", or a subset thereof can serve to quantify data contained in the record. Furthermore, the record can specify an ID of a communication partner for each active period. The latter feature can enable cross-verification of records submitted by UTs, as discussed in detail, infra.

Wireless terminals operated in a peer-to-peer fashion can be configured to track respective spectrum usage efficiently. Processing resources can therefore be conserved at network components when such terminals compile and report their own accounting records to the infrastructure. However, because the terminals are often only marginally controlled, or not controlled at all, by the operator's network during peer-to-peer communication, security risks arise due to device-managed tracking and reporting.

Moreover, accurate data related to respective UT resource usage can be employed in connection with billing advertisers (e.g., who pay as a function of UT usage, or access thereto by respective advertisers), charging users for resource utilization, fee-splitting among users, service providers, advertisers, and the like. In addition, such data can be utilized to provision services as a function of user usage, type of usage, preferences, etc. as well as to set pricing for service providers, advertisers and the like for targeting a subset of users. Accordingly, aspects described herein can facilitate tracking of resource utilization, optimizing monetizing models, provisioning of services, setting rates, load balancing, enhancing user experience, personalization of services, optimizing resource allocation, and the like.

Some security threats associated with device-managed accounting can include fraud (e.g., under-reporting), failure to report, or impersonation/spoofing of accounting records on behalf of other (e.g., victim) terminals. Other security threats can exist as well, and in general can arise as a result of intentional or unintentional mis-operation of a terminal, usually under the control of a user. As described herein, security measures are provided to mitigate or avoid threat of mistaken or fraudulent reporting.

In addition to the foregoing, resource usage can be tracked and usage records compiled in a secure platform, a trusted module, or tamper-resistant module of a terminal. This can mitigate unauthorized access to the records by another module of the device (e.g., a user or device-programmable module). Storage of records can also be secure and resistant to tampering by unauthorized software/hardware modules. In addition, such records can be securely provided to a software/hardware portion that performs the digital signing utilizing a UT-specific secret data (e.g., private key associated with a digital certificate). Once the records are digitally signed as discussed supra, the signed records can be output from the secure location of the device via a secure interface for transmission to the Accounting Server.

As noted above, accounting records can contain a cumulative record of bytes or packets sent, or received by the terminal in question during a period of time, or the record can be broken down by communicating peer during a time. For example, if terminal A has had peer-to-peer communications with terminal B, and then terminal C, terminal A can report the packets, number of packets, bytes of transferred data, etc., exchanged with B separately from the packets/number of packets/bytes exchanged with C. As an optional aspect, users can opt-in in exchange for certain benefits, for example, a service provider can cross-check records of different peer devices where such devices are configured to report accounting records per-peer. Crosschecking configuration could be for all sessions or for a possibly random subset of sessions in order to reduce crosschecking overhead. In at least one aspect, at the end of a peer-to-peer communication session, two or more terminals can exchange accounting records of a completed session for crosschecking, and respectively can obtain a summary of the session digitally signed by a private key particular to the partner terminal. Crosschecking and cross signing enables additional system optimizations, such as employing a single peer-to-peer partner to submit accounting records for a session, which are signed by both partners. Which terminal performs the reporting can be negotiated/configured or determined statistically, and by mutual agreement of modules of such terminals.

As used in the subject disclosure, the terms "component," "system," "module" and the like are intended to refer to a computer-related entity, either hardware, software, software in execution, firmware, middle ware, microcode, and/or any combination thereof. For example, a module can be, but is not limited to being, a process running on a processor, a processor, an object, an executable, a thread of execution, a program, a device, and/or a computer. One or more modules can reside within a process, or thread of execution; and a module can be localized on one electronic device, or distributed between two or more electronic devices. Further, these modules can execute from various computer-readable media having various data structures stored thereon. The modules can communicate by way of local or remote processes such as in accordance with a signal having one or more data packets (e.g., data from one component interacting with another component in a local system, distributed system, or across a network such as the Internet with other systems by way of the signal). Additionally, components or modules of systems described herein can be rearranged, or complemented by additional components/modules/systems in order to facilitate achieving the various aspects, goals, advantages, etc., described with regard thereto, and are not limited to the precise configurations set forth in a given figure, as will be appreciated by one skilled in the art.

Furthermore, various aspects are described herein in connection with a user terminal (UT). A UT can also be called a system, a subscriber unit, a subscriber station, mobile station, mobile, mobile communication device, mobile device, remote station, remote terminal, access terminal (AT), user agent (UA), a user device, or user equipment (UE). A subscriber station can be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem or similar mechanism facilitating wireless communication with a processing device.

In one or more exemplary embodiments, the functions described can be implemented in hardware, software, firmware, middleware, microcode, or any suitable combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media may be any physical media that can be accessed by a computer. By way of example, and not limitation, such computer storage media can comprise RAM, ROM, EEPROM, CD-ROM or other optical disk storage, magnetic disk storage or other magnetic storage devices, smart cards, and flash memory devices (e.g., card, stick, key drive . . . ), or any other medium that can be used to carry or store desired program code in the form of instructions or data structures and that can be accessed by a computer. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

For a hardware implementation, the processing units' various illustrative logics, logical blocks, modules, and circuits described in connection with the aspects disclosed herein can be implemented or performed within one or more application specific integrated circuits (ASICs), digital signal processors (DSPs), digital signal processing devices (DSPDs), programmable logic devices (PLDs), field programmable gate arrays (FPGAs), discrete gate or transistor logic, discrete hardware components, general purpose processors, controllers, microcontrollers, microprocessors, other electronic units designed to perform the functions described herein, or a combination thereof. A general-purpose processor can be a microprocessor, but, in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other suitable configuration. Additionally, at least one processor can comprise one or more modules operable to perform one or more of the steps and/or actions described herein.

Moreover, various aspects or features described herein can be implemented as a method, apparatus, or article of manufacture using standard programming and/or engineering techniques. Further, the steps and/or actions of a method or algorithm described in connection with the aspects disclosed herein can be embodied directly in hardware, in a software module executed by a processor, or in a combination of the two. Additionally, in some aspects, the steps or actions of a method or algorithm can reside as at least one or any combination or set of codes or instructions on a machine-readable medium, or computer-readable medium, which can be incorporated into a computer program product. The term "article of manufacture" as used herein is intended to encompass a computer program accessible from any suitable computer-readable device or media.

Additionally, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the terms to "infer" or "inference" refer generally to the process of reasoning about or inferring states of the system, environment, or user from a set of observations as captured via events, or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events, or data. Such inference results in the construction of new events or actions from a set of observed events and/or stored event data, whether or not the events are correlated in close temporal proximity, and whether the events and data come from one or several event and data sources.

Referring now to the drawings, FIG. 1 illustrates a wireless communication system 100 with multiple base stations 110 and multiple terminals 120, such as can be utilized in conjunction with one or more aspects. A base station (110) is generally a fixed station that communicates with the terminals and can also be called an access point, a Node B, or some other terminology. Each base station 110 provides communication coverage for a particular geographic area or coverage area, illustrated as three geographic areas in FIG. 1, labeled 102a, 102b, and 102c. The term "cell" can refer to a base station and/or its coverage area depending on the context in which the term is used. To improve system capacity, a base station geographic area/coverage area can be partitioned into multiple smaller areas (e.g., three smaller areas, according to cell 102a in FIG. 1), 104a, 104b, and 104c. Each smaller area (104a, 104b, 104c) can be served by a respective base transceiver subsystem (BTS). The term "sector" can refer to a BTS and/or its coverage area depending on the context in which the term is used. For a sectorized cell, the BTSs for all sectors of that cell are typically co-located within the base station for the cell. The RUM accumulation/utilization techniques described herein can be used for a system with sectorized cells as well as a system with multiple un-sectorized cells (e.g., a plurality of cells of a larger geographic area). For simplicity, in the following description, unless specified otherwise, the term "base station" is used generically for a fixed station that serves a sector as well as a fixed station that serves a cell. In addition, the term "cell" is used generically to refer to a geographic cell comprising multiple sectors, or a geographic area comprising multiple cells.

Terminals 120 are typically dispersed throughout the system, and each terminal 120 can be fixed or mobile. Terminals 120 can also be called a mobile station, user equipment, a user device, or some other terminology, as discussed above. A terminal 120 can be a wireless device, a cellular phone, a personal digital assistant (PDA), a wireless modem card, and so on. Each terminal 120 can communicate with zero, one, or multiple base stations 110 on the downlink and uplink at any given moment. The downlink (or forward link) refers to the communication link from the base stations to the terminals, and the uplink (or reverse link) refers to the communication link from the terminals to the base stations. As used herein, a base station with which a terminal 120 maintains an active communication or an active registration is termed a "serving base station".

For a centralized architecture, a system controller 130 couples to base stations 110 and provides coordination and control for base stations 110. For instance, as discussed herein, the system controller can obtain accounting records submitted by terminals 120 to the base stations 110, and managing the accounting records at the system controller 130. Further, the system controller 130 can cross-check accounting records that are delineated by peer node (e.g., obtained by one base station or records obtained by multiple base stations 120 and stored in a database at the system controller 130), to provide additional verification of data submitted in such records.

For a distributed architecture, base stations 110 can communicate with one another as needed (e.g., employing a backhaul network, not depicted). Data transmission on the forward link often occurs from one access point to one access terminal at or near the maximum data rate that can be supported by the forward link and/or the communication system. Additional channels of the forward link (e.g., control channel) can be transmitted from multiple access points to one access terminal. Reverse link data communication can occur from one access terminal to one or more access points.

Figure 2:
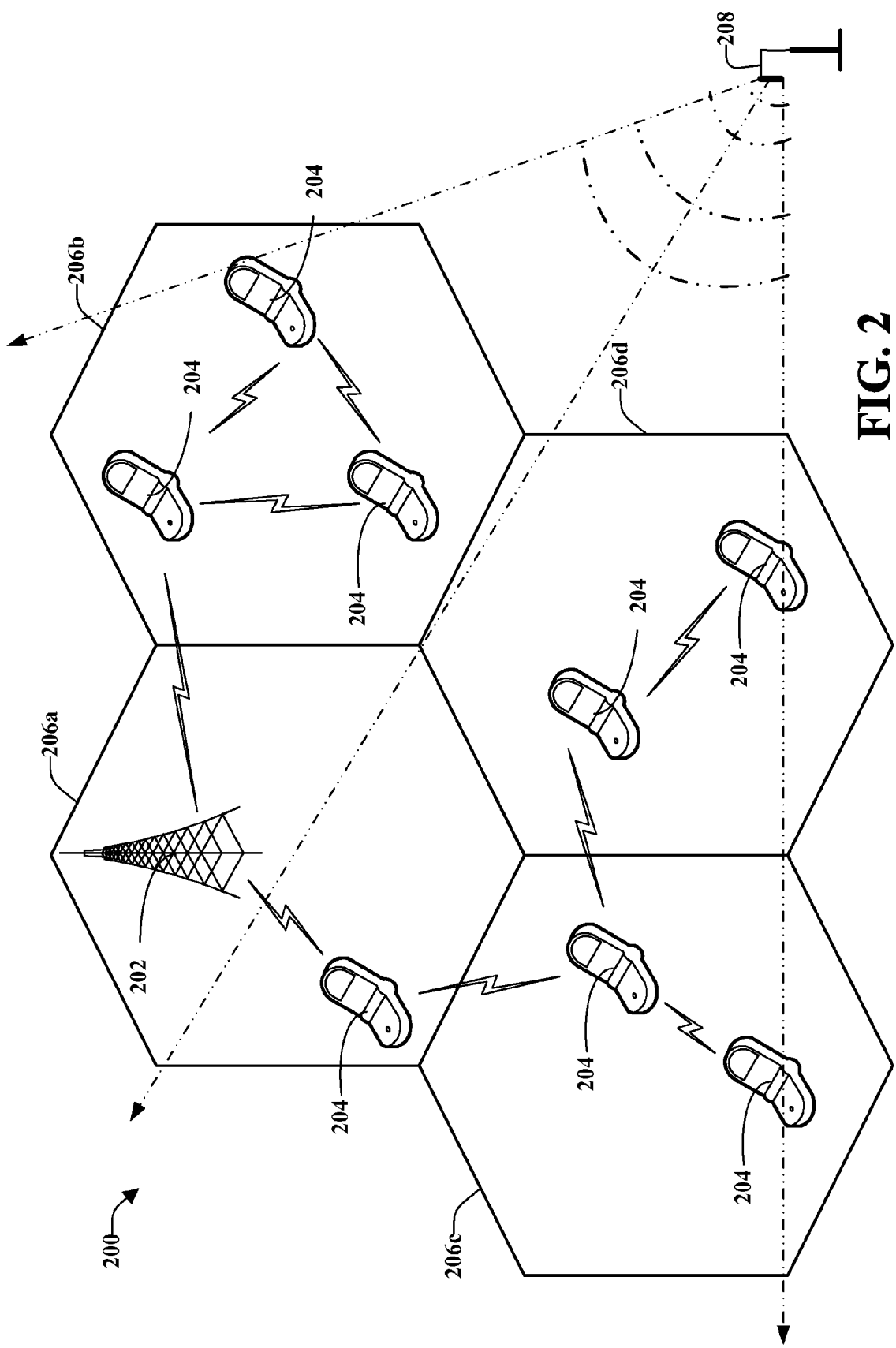
FIG. 2 depicts a block diagram of an example communication apparatus for employment with a wireless communication environment.

FIG. 2 is an illustration of a semi-planned ad hoc wireless communication environment 200, in accordance with various aspects. System 200 can comprise one or more base stations 202 in a cell, or sector (206a, 206b, 206c, 206d) that receives, transmits, repeats, etc., wireless communication signals to other base stations (not depicted), or to one or more mobile devices 204. As illustrated, base station 202 can provide communication coverage for a particular geographic area 206a. The base station 202 can comprise a transmitter chain and a receiver chain, each of which can in turn comprise a plurality of components associated with signal transmission and reception (e.g., processors, modulators, multiplexers, demodulators, demultiplexers, antennas, and so forth.), as will be appreciated by one skilled in the art (e.g., see FIG. 13, infra).

Mobile devices 204 can be, for example, cellular phones, smart phones, laptops, handheld communication devices, handheld computing devices, satellite radios, global positioning systems, PDAs, or any other suitable device configured for wireless data exchange with a remote device. It should be appreciated that mobile devices 204 can also receive, transmit, repeat, etc., wireless communication signals to each other and/or to the base station(s) 202 of system 200. Additionally, system 208 can comprise a synchronization transmitter 208 that facilitates ad-hoc communication between the mobile devices 204. For instance, synchronization transmitter 208 can transmit a synchronization timing sequence employed by the mobile terminals as a timing reference for peer-to-peer transmission, reception, processing, or the like (e.g., see also FIG. 13). In some circumstances, the timing sequence can be broadcast over a relatively wide geographic area (e.g., comprising multiple cells or sectors 206a, 206b, 206c, 206d), since the timing sequence can be a simple pulse signal generating and receiving little interference for other devices (202, 204). System 200 can be employed in conjunction with various aspects of the subject disclosure in order to facilitate providing a wireless communication environment (200), as set forth herein.

Figure 3:
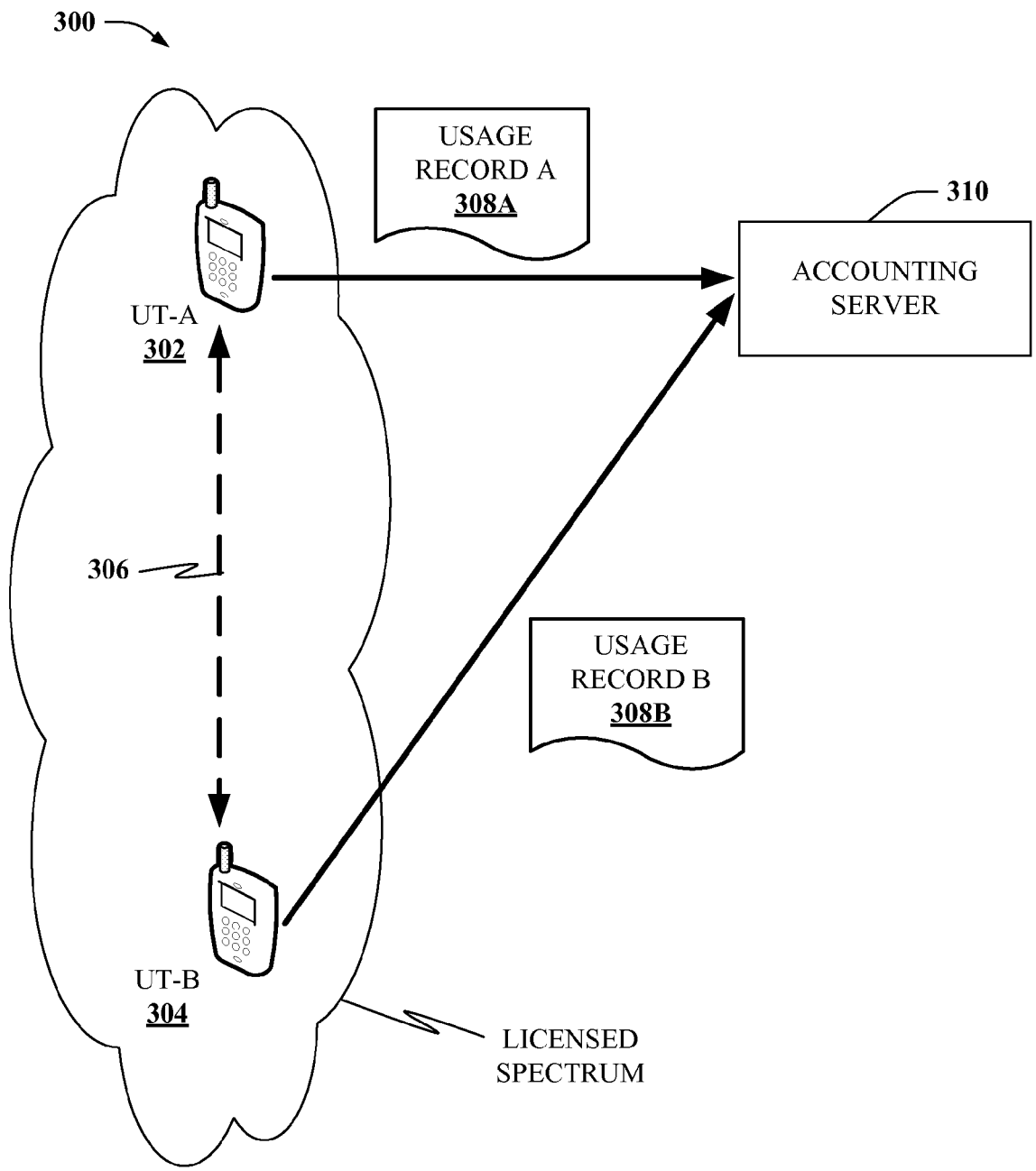
FIG. 3 depicts a block diagram of an example ad-hoc communication between user terminals (UTs) according to aspects of the subject disclosure.

FIG. 3 depicts a block diagram of an example system 300 of ad-hoc communication according to aspects of the subject disclosure. System 300 comprises a first UT, UT-A 302 that maintains wireless communication link 306 with a second UT, UT-B 304. The UTs 302, 304 are configured to track wireless resources utilized by the UTs 302, 304 in conjunction with the wireless link 306 and quantize data sent, received, or consumed in conjunction with such wireless resources. The quantized data can be compiled into a resource usage record (308A, 308B) that can be transmitted to accounting server 310 of a wireless network. According to particular aspects of the subject disclosure, the resource usage record (308A, 308B) is digitally signed with a private key associated with a digital certificate specific to a UT (302, 304) compiling the report. Accordingly, accounting server 310 can verify a UT (302, 304) submitting a usage record (308A, 308B) and verify whether the data included in such record (308A, 308B) is authentic.

UT (302, 304) can employ a secure tracking device (not depicted, but see FIG. 8 at 812) to track resource usage of UT (302, 304) in conjunction with wireless data exchange employed by the UTs 302, 304. As utilized herein, a resource can include data exchanged via a licensed frequency (e.g., a cellular frequency), use of a mobile device application (e.g., media file, streaming video application, streaming audio application, or the like), data consumed in conjunction with the mobile device application, or the like. In addition, data can be quantified by a number of IP data packets transmitted or received by UT (302, 304), or consumed by applications of UT (302, 304), a number of bytes transmitted/received/consumed by UT (302, 304), or the like. In addition to the foregoing, utilization of a resource can be quantified by a period of time that UTs 302, 304 maintain wireless link 306, or a link with a base station or application server (not shown), for instance in conducting voice communication or data communication (e.g., downloading data, watching news, sports, etc., from an network application server), and so on. Thus, in at least some aspects of the subject disclosure, UT resource usage can include peer-to-peer usage, UT-network usage, or peer-to-peer usage in conjunction with UT-network usage. It is to be appreciated, however, that the foregoing resources and resource utilization are examples only. Other suitable examples of resource utilization, or data quantization determined by way of the context provided herein are contemplated as track-able resources that can be utilized in conjunction with wireless data exchange.

UTs 302, 304 can track resource usage by various mechanisms. For instance, data packets, bytes, etc., sent, received and/or consumed by UT applications can be counted and stored in memory (e.g., tamper-resistant memory) of the UTs 302, 304. In other aspects, the resource utilization can be logged and maintained in a data/resource log stored in the memory. Other mechanisms of tracking resource usage by an electronic device are contemplated herein.

Resource usage tracked by UTs 302, 304 is compiled into a usage or accounting record 308A, 308B by the respective UTs 302, 304. The resource/accounting records 308A, 308B can be secured by UTs 302, 304 by employing a digital certificate particular to each UT. Thus, for instance, UT-A 302 can employ a private key associated with a digital certificate specific to UT-A 302 to digitally sign usage record A 308A. Furthermore, as discussed in more detail below, UT-A 302 can receive a summary of data exchanged between UT-A 302 and UT-B 304, signed with a private key associated with a digital certificate specific to UT-B 304.

Accounting server 310 can employ a public key associated with UT-A 302 or UT-B 304 to verify authenticity of usage record A or usage record B, respectively. The public keys can be obtained directly from UT-A or UT-B, since the public keys are part of the terminal-specific digital certificate; alternatively, the public keys can be obtained from a database managed by accounting server 310 or a network component coupled with accounting server 310. As one specific example, accounting server 310 can receive a usage record(s) (308A, 308B) via wired or wireless data exchange with UT-A 302 and/or UT-B 304. The accounting server 310 can obtain a UT-specific public key(s) associated with the respective UT(s). The UT-specific public key(s) can be employed by accounting server 310 to verify the UT-specific digital signature(s) of the received usage record(s) (308A, 308B). Specifically, data signed with the digital signature(s) can be coupled with the UT-specific public key(s) (e.g., according to a suitable digital signature algorithm) to verify the signature(s). If the verification of the signature(s) of the usage record(s) succeeds, the record(s) (308A, 308B) and data included therein can be verified as accurate and initiated by a UT associated with the UT-specific public key. If the verification of the signature(s) of the usage record(s) does not pass, the record(s) can be flagged as corrupt or untrustworthy, or the like. Once the digital signature(s) is verified, accounting server 310 can read the data included within the usage record(s) (308A, 308B) for data management, UT billing, or like accounting functions of a mobile or wireless network.

According to at least one further aspect of the subject disclosure, at least one of the UTs (302, 304) can provide a usage summary associated with the wireless link 306 to the other respective UT (302, 304) participating in the link. The usage summary can be signed by the UT-specific private key associated with the certificate belonging to the sending UT(s) 302, 304. A usage summary received from a partner UT (302, 304) can be included in the usage report (308A, 308B) compiled by the receiving UT (302, 304). Accordingly, the usage report (308A, 308B) can be signed by, or include the UT-specific digital signature of both devices participating in the wireless link 306. Accounting server 310 can thus verify the digital signature of both UTs (302, 304), for instance as described above, as a further verification of the usage report (308A, 308B). In some aspects, accounting server 310 can cross-verify data included in one usage report, for instance usage report 308A, with data included in a second usage report, usage report 308B for instance. Particularly, where usage report 308A indicates a communication with UT-B 304, a usage report (308B) associated with UT-B 304 can be referenced to further verify accuracy of data submitted in usage report 308A.

Figure 4:
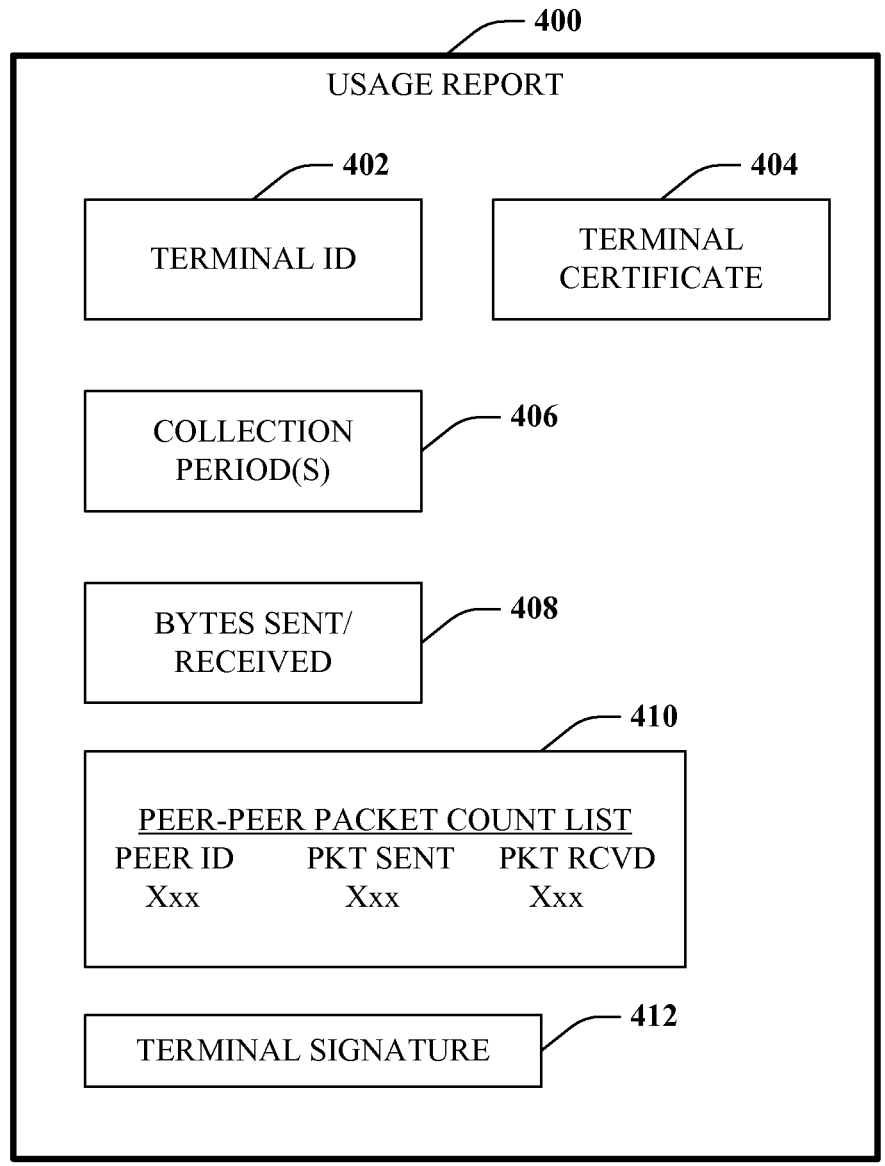
FIG. 4 illustrates a block diagram of a sample certified usage record submitting by a UT to a network server, according to other aspects.

FIG. 4 illustrates an example usage record 400 according to aspects of the subject disclosure. Usage record 400 can comprise a terminal ID 402 identifying an ID of a UT compiling the usage record 400. The ID can include a mobile subscriber identity (MSI), an international mobile subscriber identity (IMSI), a subscriber ID associated with the UT, or a like identifier. Additionally, usage report 400 can comprise a terminal certificate 404. Terminal certificate/404 can be utilized to verify authenticity of a digital signature (412) utilized to authenticate/integrity-protect the usage report 400. In addition to the foregoing, collection period(s) 406 can be specified by the usage report 400. The collection period(s) 406 can, for instance, indicate a period of resource usage utilized in conjunction with wireless data exchange initiated by the UT. For instance, the collection period(s) 406 can be a single time period (e.g., a day, week, month, etc.) over which usage data is collected by the UT, multiple time periods each corresponding with an active resource usage (e.g., data and/or voice calls) by the UT, or both. Further to the foregoing, usage report 400 can comprise bytes sent/received/consumed 408 by the UT in conjunction with wireless data exchange. The bytes can be, for instance, bytes sent/received/consumed over the collection period(s) 406. Additionally, usage report 400 can comprise a peer-to-peer IP data packet count list 410. The peer-to-peer IP data packet count list 410 can indicate a peer ID of a peer node participating in an instance of wireless data exchange with the UT, a number of packets sent to such peer node for the instance, and a number of packets received from such peer node for the instance. Additionally, usage report 400 can comprise a UT-specific signature 412 of the UT compiling the usage report 400. The UT-specific signature 412 can be utilized to secure the information (402, 404, 406, 408, 410) included in the usage report 400, and therefore can be used by any suitable verifier to assess whether such information (402, 404, 406, 408, 410) is compromised.

Figure 5:
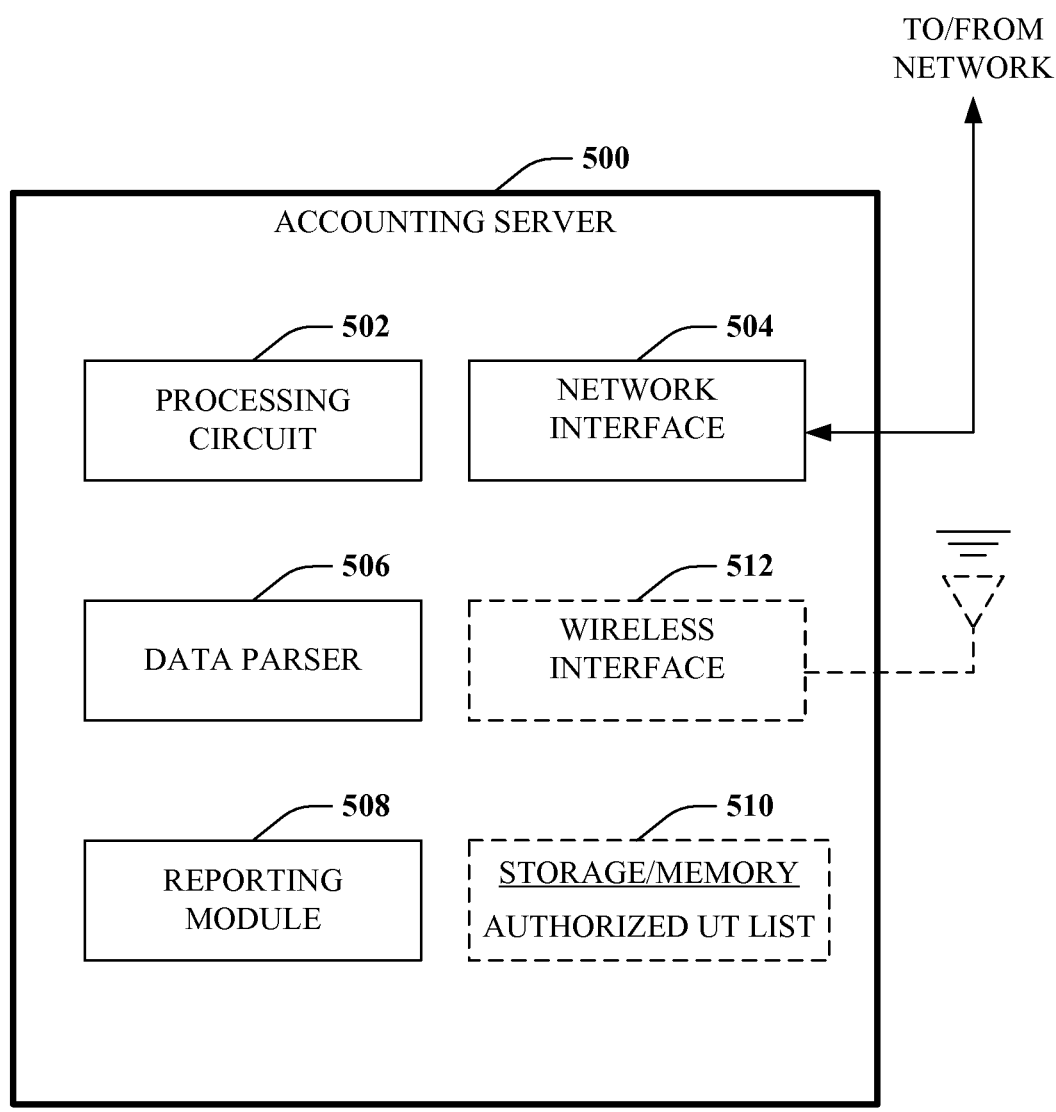
FIG. 5 depicts a block diagram of an example network accounting server according to one or more additional aspects.

FIG. 5 depicts a block diagram of an example accounting server 500 according to aspects of the subject disclosure. Accounting server 500 can be utilized by a mobile network to receive, verify, or manage resource usage reports compiled and submitted by mobile terminals engaging in wireless data exchange with remote communication nodes (e.g., other mobile terminals, wireless access points, base stations, etc.). Specifically, accounting server 500 can be configured to digitally verify usage reports compiled and submitted by such terminals.

Accounting server 500 can comprise a communication interface 504. Communication interface 504 can communicatively couple with a network or a combination of networks (e.g., an Internet Protocol [IP] network and a mobile network), to exchange data with one or more UTs. Specifically, communication interface 504 can obtain a reported resource usage (e.g., a usage report) from a UT; the reported usage is certified with a terminal-specific digital signature. Optionally, accounting server 500 can initiate a response message to a UT submitting the reported resource usage, the response message acknowledging receipt of the reported resource usage.

Additionally, accounting server 500 can comprise a processing circuit 502. Processing circuit 502 can validate a reported resource usage obtained by communication interface 504. Validation can comprise employing a public key associated with a UT compiling and submitting the reported resource usage to verify a terminal-specific digital signature included in the reported resource usage. According to at least one aspect, processing circuit 502 can further employ one or more public keys associated with peer nodes participating in communication with the UT compiling and submitting the reported resource usage to further validate the reported resource usage. For instance, the one or more public keys can be employed to verify terminal-specific digital signatures of such peer nodes included in the reported resource usage. In some aspects, the public keys of peer nodes can be maintained in storage/memory 510, which stores an authorized list of UTs (e.g., provided by UT service providers) and public keys associated with such UTs. In other aspects of the subject disclosure, accounting server 500 can obtain a public key from a digital certificate submitted by a UT.

In addition to the foregoing, accounting server 500 can comprise a data parser 506 that extracts usage-related information from a reported resource usage obtained at communication interface 504. The data parser 506 can extract, for instance, a number of packets and/or number of bytes sent, received or consumed in wireless data exchange associated with a UT. Further, the data parser 506 can extract an ID of a node that originates or receives data sent or received, respectively, by the UT, a time, or duration of a wireless communication associated with the UT, or activation or duration of elevated quality of service (QoS) mechanisms associated with the UT. Data extracted by data parser 506 can be employed for subscriber billing and accounting services based on the reported resource usage provided by the UT. Specifically, a reporting module 508 can employ the network interface 504 to submit data extracted by data parser 506 to a service provider's billing and charging function.

According to at least one additional aspect of the subject disclosure, data parser 506 can extract substandard QoS levels observed by the UT in conjunction with data exchange. Alternatively, or in addition, the data parser 506 can extract under-usage (e.g., of pre-plan minutes, bytes, data packets, etc.) information reported in the resource usage provided by the UT. The substandard QoS levels, or under-usage information, can be included in the usage report by reporting module 508 and, for instance, utilized to adjust billing or provide billing credits, or the like.

Further to the above, accounting server 500 can optionally trigger submission of reported resource usage from a UT, according to particular aspects of the disclosure. For instance, communication interface 504 can optionally initiate a request that is translated by mobile network components into a wireless polling message, which is forwarded to the UT. In response to the polling message, the UT can submit a resource usage report to the mobile network, digitally signed as described herein, which can be routed to the communication interface 504. As another example, communication interface 504 can optionally comprise a wireless interface 512 configured for wireless communication, to communicate directly or indirectly with the UT at least in part over-the-air.

Figure 6:
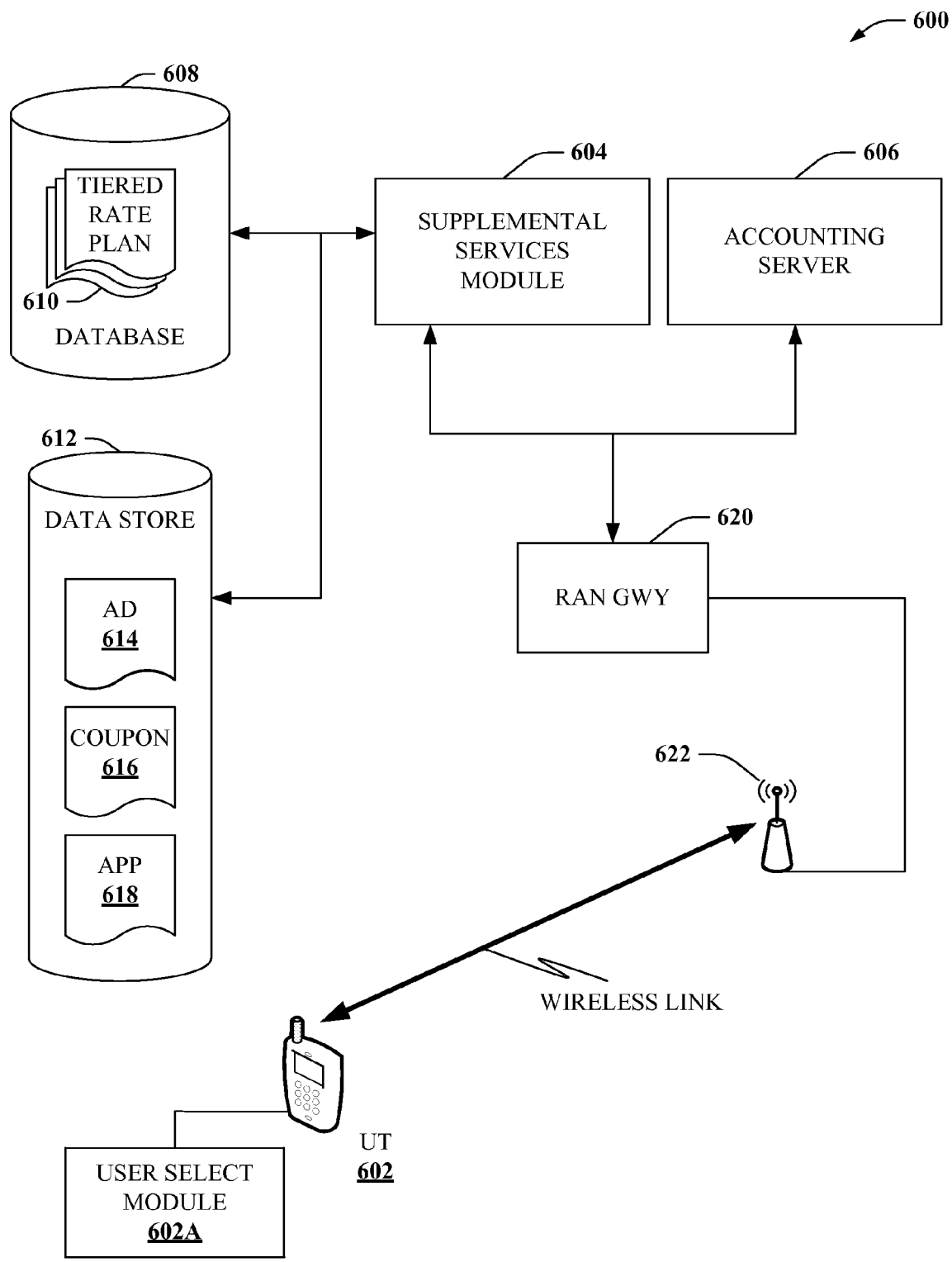
FIG. 6 depicts a block diagram of an example system that provides supplemental services and advertisement for peer-peer communication in some aspects.

FIG. 6 illustrates a block diagram of a sample system 600 that provides additional monetization of licensed spectra and provider services utilized by UT 602. System 600 can take advantage of third party service providers, advertisers, or mobile commercial entities and leverage a network provider's subscriber base in generating additional revenues. Secure data usage reported by the UT can be employed as a factor in provisioning services as a function of user usage, type of usage, or preferences, to establish or balance fee-splitting among users, or to set pricing for third parties who are provided access to subscriber bandwidth (e.g., to deliver advertisements, services, etc.). Accordingly, aspects of system 600 can facilitate secure resource utilization tracking in conjunction with optimizing monetization models, provisioning of services, setting usage rates, load balancing, enhancing user experience, personalizing services, optimizing resource allocation, and so on.

System 600 comprises a supplemental services module (service module) 604 that serves as an interface between UT 602 and third party providers (e.g., advertisers, service providers, mobile commercial entities such as coupon providers). Service module 604 can establish a billing rate for third party access to data exchange involving the UT 602. It is to be appreciated that access to such data exchange can take various suitable forms depending on the data, service or application delivered to the UT 602. As one example, the access can involve delivering an advertisement 614 to the UT 602 in conjunction with the data exchange. In other aspects, the access can involve delivering, and optionally facilitating wireless redemption of mobile coupon 616 provided by the third party. In yet other aspects, the access can involve integrating an application 618 with the data exchange (e.g., a multi-media game) billed by the third party provider to a UT subscriber (e.g., via an Internet pay service). The third party data can be delivered to UT 602 in various suitable manners as well. For instance, third party files/applications can be extracted from data store 612 and delivered over-the-air to the UT 602 (e.g., via a radio access network (RAN) gateway (GWY) 620 and a RAN transmitter 622). Alternatively, the files/applications can be delivered over-the-air to a peer-to-peer partner of UT 602. In at least some aspects, the files/applications can be downloaded from a network server (e.g., web server, Internet server, etc.) and loaded onto UT 602 manually.

UT 602 can track receipt, execution and/or data exchange pertinent to the services/applications provided by service module 604. As described herein, UT 602 can compile and report such receipt/execution/data exchange in a secure manner utilizing secure components and a UT-specific digital certificate. The report is received at an accounting server 606 via a network communicatively coupled with UT 602 (e.g., a mobile network comprising base station 622 and RAN gateway 620). The accounting server 606 can calculate billing to respective parties (e.g., to the third party, to the subscriber) based at least in part on the usage report. Thus, delivery of services/applications to the UT can be billed to the third party providing such services/applications. Alternatively, or in addition, facilitating delivery/implementation of the services/applications can be billed to the UT subscriber (e.g., facilitating a wireless gaming application, mobile coupon delivery and/or redemption thereof).

In at least some aspects, billing amount or availability of services/applications can be based on a rate plan 610 of a particular subscriber. The rate plan 610 might, for instance, establish particular mobile or peer-to-peer rates or provide modified rates if third party ads can be delivered to UT 602. In such case, user selection module 602A can enable the user to opt-in for third party advertisements, services, applications, etc. In some aspects, user selection module 602A can enable a user of UT 602 to indicate a multi-level participation program, where levels of the participation program correspond to degrees of access for third party providers/vendors at various billing/usage levels. Thus, as a particular example, a user can specify that one advertisement may be delivered per peer-to-peer instance, but no mobile coupons or other applications. Such a specification can correspond to a particular tiered billing level for third parties and/or the subscriber.

Data indicating the subscriber has opted-in, and optionally a selected multi-level participation tier, can be tracked at UT 602 and included in a secure usage report. Once received, services module 604 can store the reported data in a tiered rate plan 610 associated with the subscriber at database 608. The database can later be referenced to obtain the tiered rate plan 610 data when UT 602 initiates/reports peer-to-peer activity. A particular third party service/application 614, 616, 618 can then be delivered to UT 602 based on the opted-in specifications provided by the tiered rate plan 610. Additionally, appropriate billing levels for delivery of the service/application can be determined from the tiered rate plan 610 and/or from the type of service/application delivered, as suited to network provider specifications. Billing can then be conducted by accounting server 606, based on delivery of the service/application, spectrum usage associated with the service/application, or both.

Figure 7:
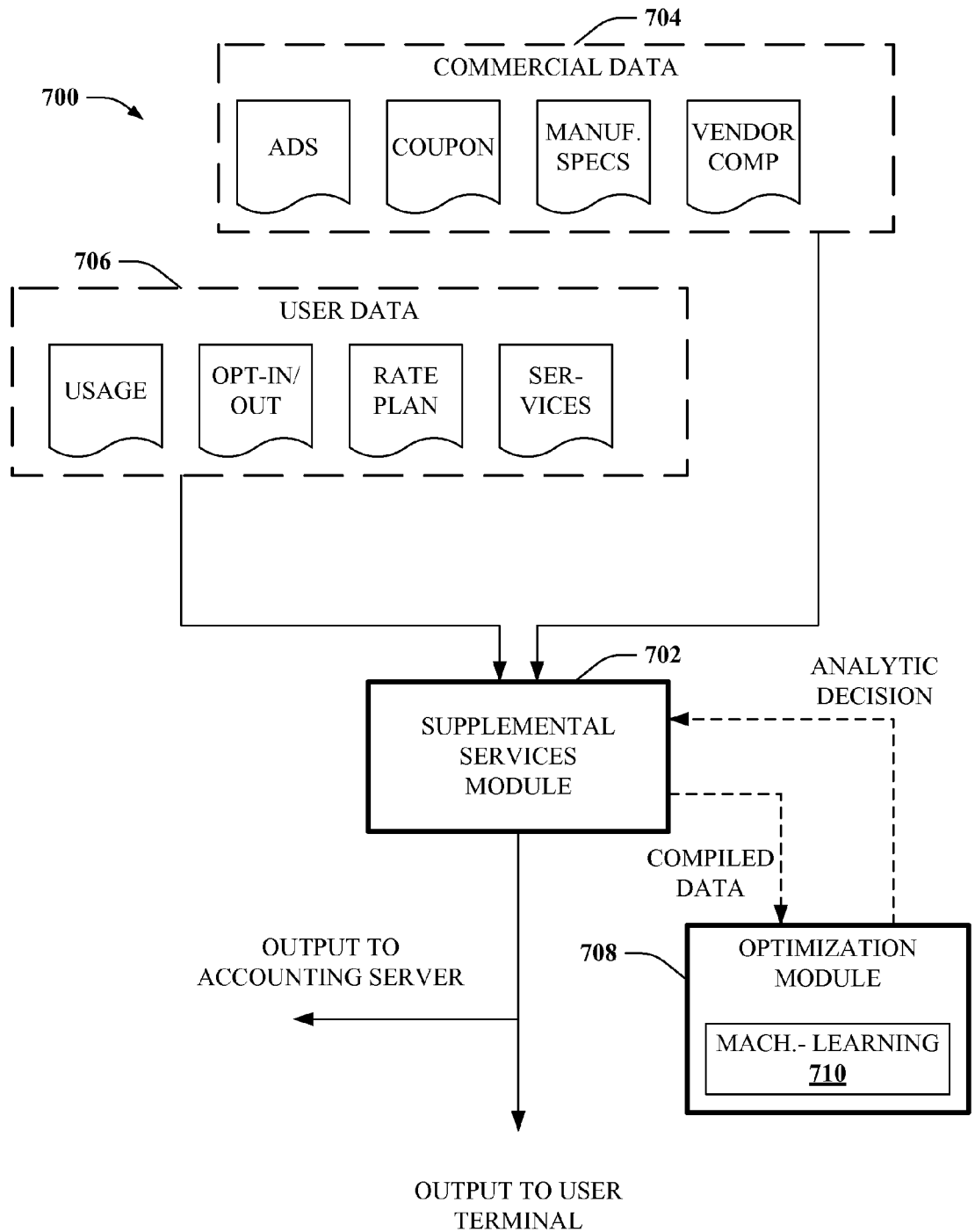
FIG. 7 illustrates a block diagram of a sample system that optimizes supplemental services and $3^{rd}$ party ads based on user data according to further aspects.

FIG. 7 illustrates a block diagram of a sample system 700 that provides optimized information for integrating targeted advertisements and other third party applications with subscriber bandwidth and/or peer-to-peer calls. System 700 can obtain information pertaining to a subscriber or subscriber account and aggregate the subscriber data with commercial requirements of third party vendors. The aggregated data is analyzed to find an optimal nexus point for relevancy, amount, timing, etc. of targeted services/applications and delivery of such services/applications to subscribers. As a result, system 700 can facilitate improved consumer response to targeted advertisement, increased utilization of third party services, and the like.

System 700 comprises a services module 702 that obtains and aggregates user usage data 706 and vendor commercial data 704. The vendor data could include various advertisements, mobile coupons, applications, etc., that can be coupled with subscriber data exchange (e.g., peer-to-peer usage). Furthermore, the vendor data 704 can include various requirements and specifications as to billing, vendor compensation, distribution and/or redemption, where suitable, of vendor services. Additionally, the data 704 can include context information, user history usage patterns, relative pricing, manufacturer usage specifications, and so on. The context information can include demographic data indicating an age, nationality, culture, political viewpoint, or other personal or social trait of typical users of the vendor services/applications. Usage history and relative pricing data can also indicate further user demographic information. Such information can be utilized to identify subscribers interested in the various services/applications based on user data 706.

The user data 706 can be compiled by network components (e.g., in conjunction with mobile network-facilitated data exchange) or compiled by UTs (e.g., in conjunction with peer-to-peer or network-facilitate data exchange), or both. The data can include various usage, context, caller, timing or demographic information about a UT subscriber. Such data can be utilized to determine a subscriber's usage context, which can be categorized into topic(s) of interest for targeted advertisements. As examples, data (706) pertaining to a particular user can include calling patterns such as peak call times and minimal call times, services and applications executed at the UT, frequency of use, as well as contextual information about those services and applications (e.g., media type, genre), peer-to-peer usage, peer-to-peer partners, data services usage and frequency, and so on. Additionally, the data (706) can include contextual information of search queries and search results, words spoken, typed, transmitted, received, etc. by the user. In some aspects, where user privacy may be at risk or where a subscriber selects a rate plan involving lower data collection (e.g., to maximize device performance, minimize overhead processing, etc., see infra), a subset of the data collection can be subject to user-approval. In such instances, a user could identify what applications, services or systems from which data is/is not to be collected on a UT, what categories of data are/are not to be collected, when data can/can not be collected, and so on.

Additionally, in some aspects, a user can select, or filter what type of user data is collected and submitted to the aggregate user data 706. In other aspects, the type, or amount of filtered data is established based on a tiered rate plan. Thus, for instance, less expensive rate plans can collect more information about the user to provide additional value for targeted advertising, and added monetization to defray network costs. More expensive rate plans can collect little or no information about the user; where the network costs are partially or wholly included in the rate plan. In other aspects, a combination of the foregoing can be implemented. For instance, the tiered rate plan can establish a baseline amount/type of data collected about the user. Additionally, the user can opt-in to have more data collected about them, optionally as a function of type or category of data, to improve targeted advertisements to the user. In some aspects, the user can specify which vendors/vendor services can access information collected about the user or deliver services/applications to the user.

User data 706 and commercial data 704 can be accessed by services module 702 and aggregated and provided to an optimization module 708. Optimization module 708 analyzes the data to identify services/applications most suited to/compatible with a particular user, or users most interested in particular services/applications. In order to infer a highest probability of interest/suitability optimization module 708 can utilize a set of models (e.g., device/technology error model, bit error history models, bit-level state charge loss model, etc.) in connection with determining or inferring probability interest or compatibility. The models can be based on a plurality of information (e.g., usage history, user profile information, vendor profile information, service/application profile information, etc.). Optimization routines associated with optimization module 708 can harness a model that is trained from previously collected data, a model that is based on a prior model that is updated with new data, via model mixture or data mixing methodology, or simply one that is trained with seed data, and thereafter tuned in real-time by training with actual field data based on parameters modified as a result of error correction instances.

In addition, optimization module 708 can employ machine learning 710 and reasoning techniques in connection with making determinations or inferences regarding optimization decisions, such as matching context of users (e.g., where data indicates an interest in Britney Spears and American Idol) with appropriate advertisements and services (e.g., Britney merchandise, albums, etc., American Idol commercials, sponsors, video games, and so on). For example, optimization module 708 can employ a probabilistic-based or statistical-based approach in connection with identifying suitable vendor services/applications with interested users. Inferences can be based in part upon explicit training of classifier(s) (not shown), or implicit training based at least upon one or more monitored results 504B, and the like, in conjunction with selecting subsets of suspect bits 504A.

Optimization module 708 can also employ one of numerous methodologies for learning from data and then drawing inferences from the models so constructed (e.g., Hidden Markov Models (HMMs) and related prototypical dependency models, more general probabilistic graphical models, such as Bayesian networks, e.g., created by structure search using a Bayesian model score or approximation, linear classifiers, such as support vector machines (SVMs), non-linear classifiers, such as methods referred to as "neural network" methodologies, fuzzy logic methodologies, and other approaches that perform data fusion, etc.) in accordance with implementing various aspects described herein. Methodologies employed by optimization module 708 can also include mechanisms for the capture of logical relationships such as theorem provers or heuristic rule-based expert systems. Inferences derived from such learned or manually constructed models can be employed in other optimization techniques, such as linear and non-linear programming, that seek to maximize probabilities of error. For example, maximizing an overall interest/relevancy between commercial data 704 and user data 706 can be achieved through such optimization techniques.

Once optimization module 708 determines a most appropriate set of services/applications for a set of users, the determination is provided to services module 702. Services module can then distribute the services/applications to various users based on user preferences (e.g., service/application relevance score, time of day, initiation/completion of a service, peer-to-peer call, maximum/minimum number of services/applications delivered per day, etc.), and manufacturer specifications (e.g., required number of vendor services delivered per day, optionally as a function of vendor billing level, user relevance score, etc.). Suitable UT feedback, either provided by a user or collected and transmitted securely as described herein, can be updated to user data 704 as additional data for the determination, to substitute a user-defined preference for the determination, or the like. Vendor/subscriber billing can be conducted upon delivering the services/applications, as described with respect to FIG. 6, supra.

Figure 8:
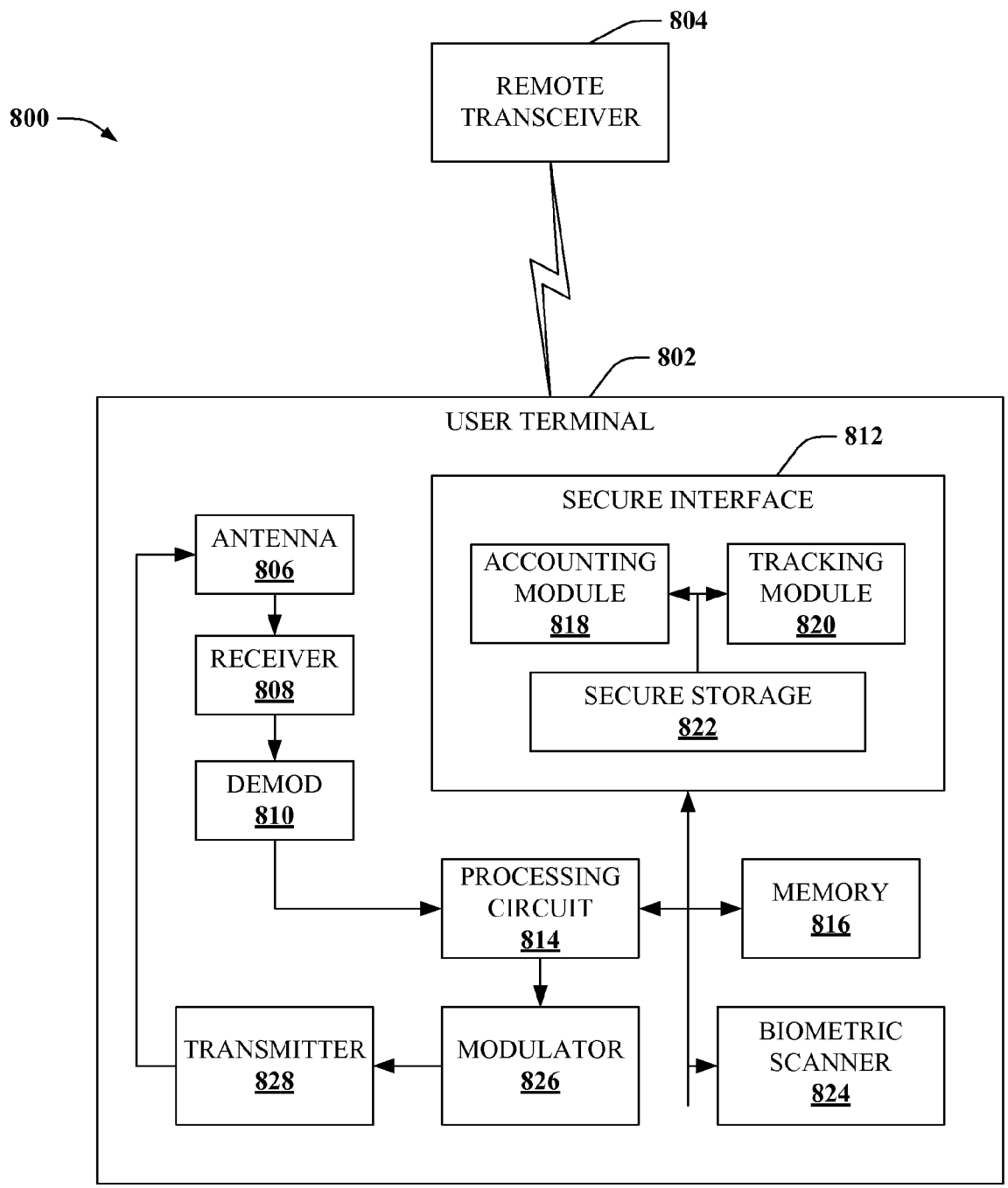
FIG. 8 depicts a block diagram of a sample mobile device configured to securely track and report resource usage according to some aspects.

FIG. 8 depicts a block diagram 800 of a sample UT 802 configured to securely track and report resource usage according to some aspects disclosed herein. UT 802 can be configured to wirelessly couple with one or more remote transceivers 804 (e.g., access point, base station, peer node). UT 802 can receive wireless signals from an access point (804) on a FL channel and respond with wireless signals on a RL channel, as known in the art. Further, UT 802 can participate in peer-to-peer or ad-hoc wireless communication with a remote peer device (804) as described herein or known in the art. Further to the above, UT 802 can be configured to track resources utilized in conjunction with wireless communication with remote transceiver 804, compile a resource report of the tracked resources, and submit the report to a serving network as described herein.

Mobile terminal 802 includes at least one antenna 806 (e.g., a transmission receiver or group of such receivers comprising an input interface) that receives a signal (e.g., wireless message) and receiver(s) 808, which performs typical actions (e.g., filters, amplifies, down-converts, etc.) on the received signal. In general, antenna 806 and transmitter 826 (collectively referred to as a transceiver) can be configured to facilitate wireless data exchange with remote transceiver 804.

Antenna 806 and receiver(s) 808 can also be coupled with a demodulator 810 that can demodulate received symbols and provide them to a processing circuit 814 for evaluation. It should be appreciated that processing circuit 814 can control and/or reference one or more components (806, 808, 810, 814, 816, 824, 828) of the UT 802. Further, processing circuit 814 can execute one or more modules, applications, engines, or the like (812, 824) that comprise information or controls pertinent to executing functions of the mobile terminal 802. For instance, obtaining biometric user data to verify user identity. In addition, processing circuit 814 can trigger secure interface 812 to implement various secure or tamper-resistant functions, such as tracking resource utilization for the UT 802, compiling a resource utilization record, or digitally signing the resource usage record with a private key specific to the UT 802, as described herein.

Mobile terminal 802 can additionally include memory 816 that is operatively coupled to processing circuit 814. Memory 816 can store data to be transmitted, received, and the like, and instructions suitable to conduct wireless communication with a remote device (804). Further, memory 816 can store operating files or data for the modules, applications, engines, etc. (812, 824) executed by processing circuit 814, above.

In at least some aspects of the disclosure, UT 802 can comprise a secure interface 812 that prevents or mitigates access to an accounting module 818, tracking module 820 or secure storage 822. The secure interface 812 can be a tamper resistant module that verifies communication with components of the UT 802 protected by the secure interface 812. According to some aspects, the secure interface 812 can specifically restrict access to resource utilization data managed by tracking module 820, an in-progress resource usage report of such utilization data compiled by accounting module 818, instructions, code or functions for compiling such report, or a private key associated with a digital certificate specific to UT 802 stored (e.g., burned in upon manufacture of UT 802) in secure storage 822.

UT 802 comprises an accounting module 818 that compiles the resource usage report from resource utilization monitored by tracking module 820, as described herein. Resource tracking and report compilation can be implemented by secure processing (not depicted) associated with the secure interface 812. Once the resource usage report is compiled, accounting module 818 can digitally sign the compiled report with a private key of UT 802 maintained at the secure storage 822. Once digitally signed, the usage report can be output via the secure interface 812 to processing circuit 814 for wireless transmission via modulator 826 and transmitter 828. The transmitter 828 can be employed, for instance, to submit the digitally signed usage report to a mobile network (804), directly or indirectly (e.g., by way of a peer node).

The resource usage record compiled by accounting module 818 can be substantially as is described herein, or as known in the art. In some aspects, accounting module 818 can further obtain from remote transceiver 804 a digitally signed summary of data exchange between UT 802 and remote transceiver 804, signed by a digital signature particular to the remote transceiver 804 (e.g., where the remote transceiver 804 is another user terminal, such as a relay or a communication partner). The digitally signed summary 804 can be included in the resource usage report as an additional verification of tracked resource data specified in the report.

According to at least one additional aspect, UT 802 can comprise a biometric scan module 824 that can be utilized to verify identity of a user of the UT 802. The biometric scanner 824 can comprise, for instance, a finger or thumb print scanner, a voice recognition module, a retina scanner, or like module biometric identification device. Biometric data obtained from the biometric scanner 824 (e.g., finger/thumb print scan, voice data, retina scan data, etc.) can be provided to processing circuit 814 to be referenced against biometric data of a user stored in memory 816 (or, e.g., in secure storage 822). In some aspects, access to some or all functions, applications or resources of UT 802 can be conditioned on the biometric data matching user data stored in memory (816 or 822). Optionally, the scanned and/or stored biometric data can be utilized, at least in part, to digitally sign the resource usage record compiled by the accounting module 818 (e.g., the biometric data can be employed in generating a private key for the terminal 802 that is specific to a device user, or in generating an encryption key for the device/user, or the like).

The aforementioned systems have been described with respect to interaction between several components, modules and/or communication interfaces. It should be appreciated that such systems and components/modules/interfaces can include those components or sub-components specified therein, some of the specified components or sub-components, and/or additional components. For example, a system could include UT-A 302, UT-B 304, each comprising a secure interface 812, and accounting server 500, or a different combination of these and other components. Sub-components could also be implemented as components communicatively coupled to other components rather than included within parent components. Additionally, it should be noted that one or more components could be combined into a single component providing aggregate functionality. For instance, tracking module 820 can include accounting module 818, or vice versa, to facilitate tracking resource utilization data and compiling a resource usage report of such data by way of a single component. The components can also interact with one or more other components not specifically described herein but known by those of skill in the art.

Furthermore, as will be appreciated, various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, and in addition to that already described herein, can automate certain mechanisms or processes performed thereby to make portions of the systems and methods more adaptive as well as efficient and intelligent.

In view of the exemplary systems described supra, methodologies that may be implemented in accordance with the disclosed subject matter will be better appreciated with reference to the flow charts of FIGS. 9-12. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter. Additionally, it should be further appreciated that the methodologies disclosed hereinafter and throughout this specification are capable of being stored on an article of manufacture to facilitate transporting and transferring such methodologies to computers. The term article of manufacture, as used, is intended to encompass a computer program accessible from any computer-readable device, device in conjunction with a carrier, or storage medium.

Figure 9:
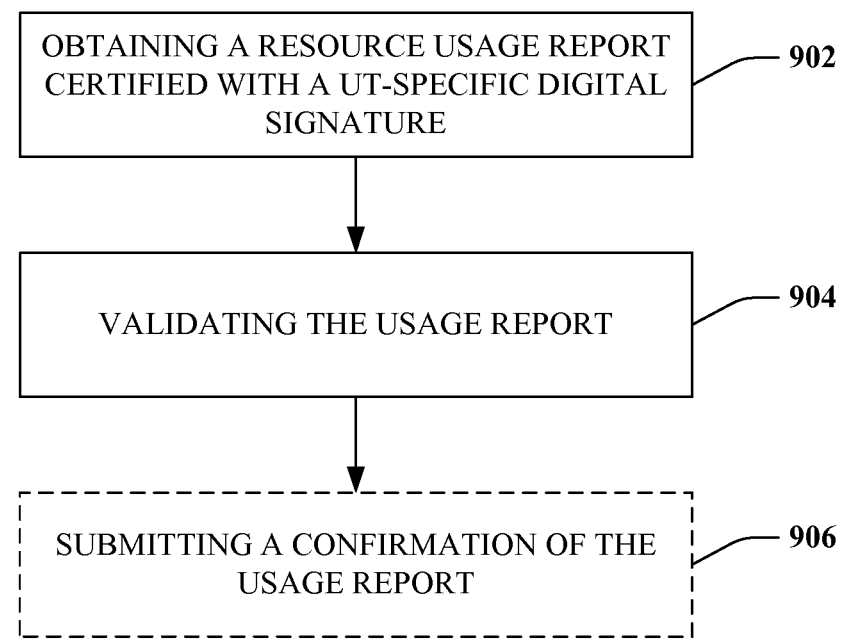
FIG. 9 illustrates a flowchart of an example methodology for facilitating secure resource reporting at terminal devices.

FIG. 9 illustrates a flowchart of an example methodology 900 for facilitating secure resource reporting at terminal devices. At 902, method 900 can obtain a reported resource usage from a UT. The reported resource usage can be certified with a terminal-specific digital signature. In addition, the reported resource usage can comprise information pertinent to wireless data exchange conducted by the UT. Certification by the terminal-specific digital signature can be utilized to verify authenticity of the information, as well as verify identity of the UT conducting the wireless data exchange. In some aspects, the reported resource usage can specify the ID of the UT, time period(s) over which the information is collected at the UT, number of data packets, or number of bytes exchanged during the wireless data exchange, an ID of a peer node or other participant to the wireless data exchange, level of QoS associated with the data exchange, or a combination of these or like information. In at least one aspect, the reported resource usage can further comprise a summary of data exchange associated with at least one peer node, the summary is certified with a digital signature of the peer node, as described herein.

At 904, method 900 can validate the reported resource usage obtained from the UT. Validation can comprise obtaining a public key associated with the terminal-specific digital signature from, for instance, a database or direct communication from the terminal owning the public key. In addition, the public key can be combined with data provided by the reported resource usage (e.g., according to an encryption or decryption algorithm) to verify the digital signature. Digital signature verification indicates the reported resource usage is valid. At 906, method 900 can optionally submit a confirmation of the usage report in response to obtaining the usage report, in response to validating the usage report, in response to generating a billing report based on the usage report, or a combination thereof. Further, the usage report can be digitally signed by a network server (e.g., a resource accounting server). As described, method 900 enables device-initiated tracking of wireless resources (e.g., licensed spectrum channels, media applications, data sent/received/consumed, etc.) and secure compilation and submission of such resources. Thus, device error, user error, unauthorized data manipulation, data corruption and/or UT spoofing can be mitigated or avoided by method 900.

Figure 10:
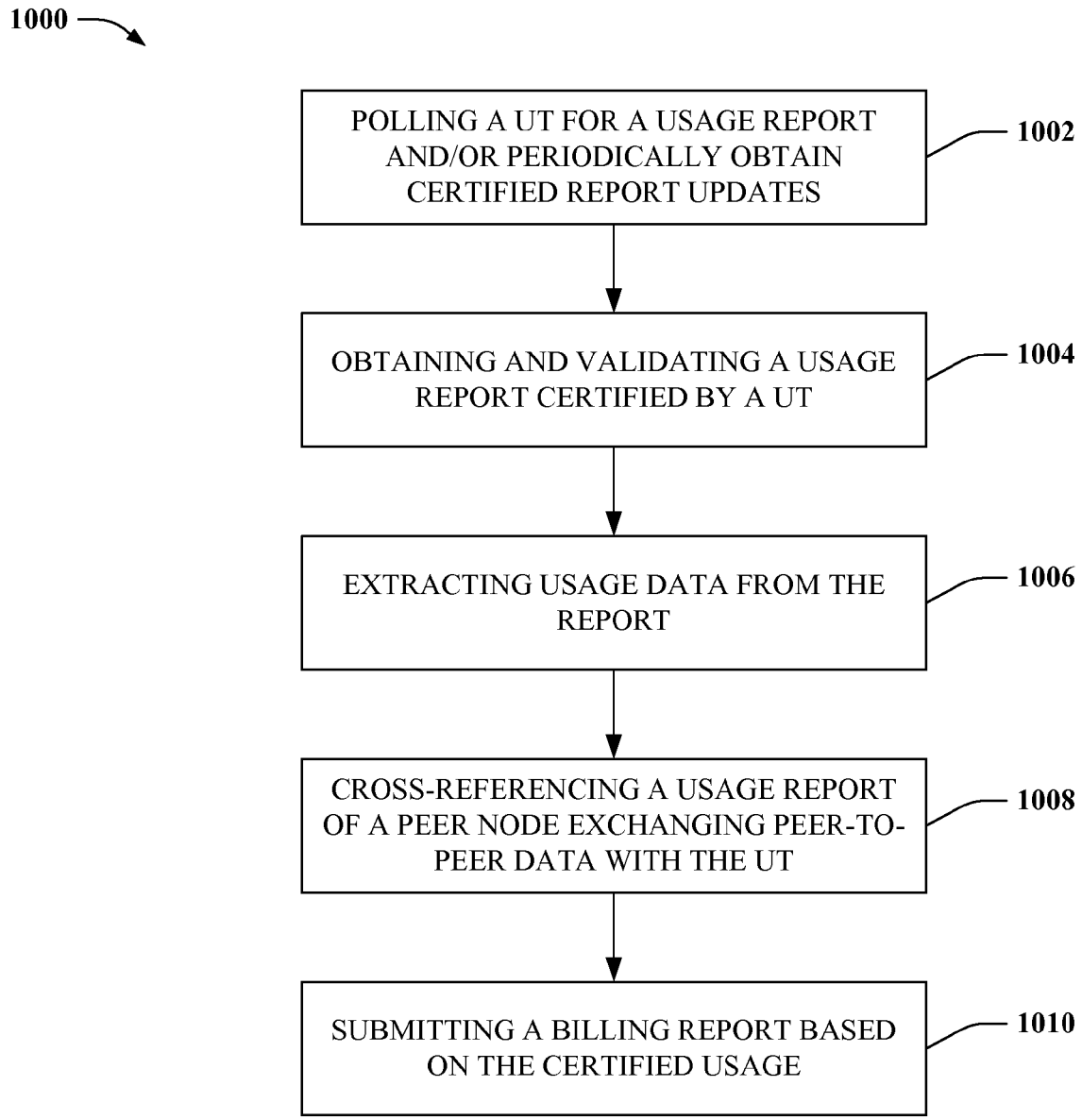
FIG. 10 depicts a flowchart of a sample methodology for obtaining and verifying resource utilization reports from one or more UTs.

FIG. 10 depicts a flowchart of a sample methodology 1000 for obtaining and verifying resource utilization reports from one or more UTs. At 1002, method 1000 can poll a UT for a resource usage report pertinent to peer-to-peer wireless data exchange conducted by the UT. Optionally, updates to the report can be periodically obtained. At 1004, method 1000 can validate the resource usage report by analyzing a terminal-specific digital signature of the UT included in the usage report, as described herein. At 1006, method 1000 can extract usage data from the report. In at least one aspect, the usage data can comprise an ID of a peer node participating at least in part in the peer-to-peer wireless data exchange. The usage data can provide a duration of the peer-to-peer data exchange, number of bytes/data packets exchanged, services utilized (e.g., streaming video services, streaming audio services, etc.), QoS level for the data exchange, or the like. At 1008, method 1000 can cross-reference a resource usage report of the peer node based on the ID of the peer node included in the usage data extracted from the resource utilization report. In some aspects, the usage report of the peer node can be digitally signed with a terminal-specific digital signature of the peer node. The usage report of the peer node can be verified based on the terminal-specific digital signature of the peer node, in similar manner as the terminal-specific digital signature of the UT. At 1010, method 1000 can submit a billing report based for the UT and/or the peer node based at least in part on the certified usage in the resource usage report, the usage report of the peer node, or both.

Figure 11:
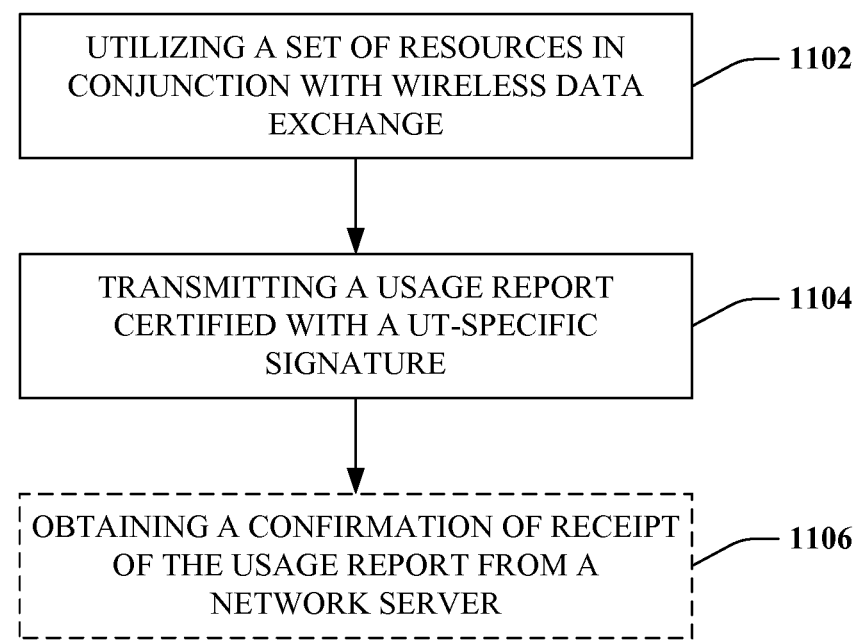
FIG. 11 illustrates a flowchart of an example methodology for securely tracking and reporting resources utilized in wireless communication.
Figure 12:
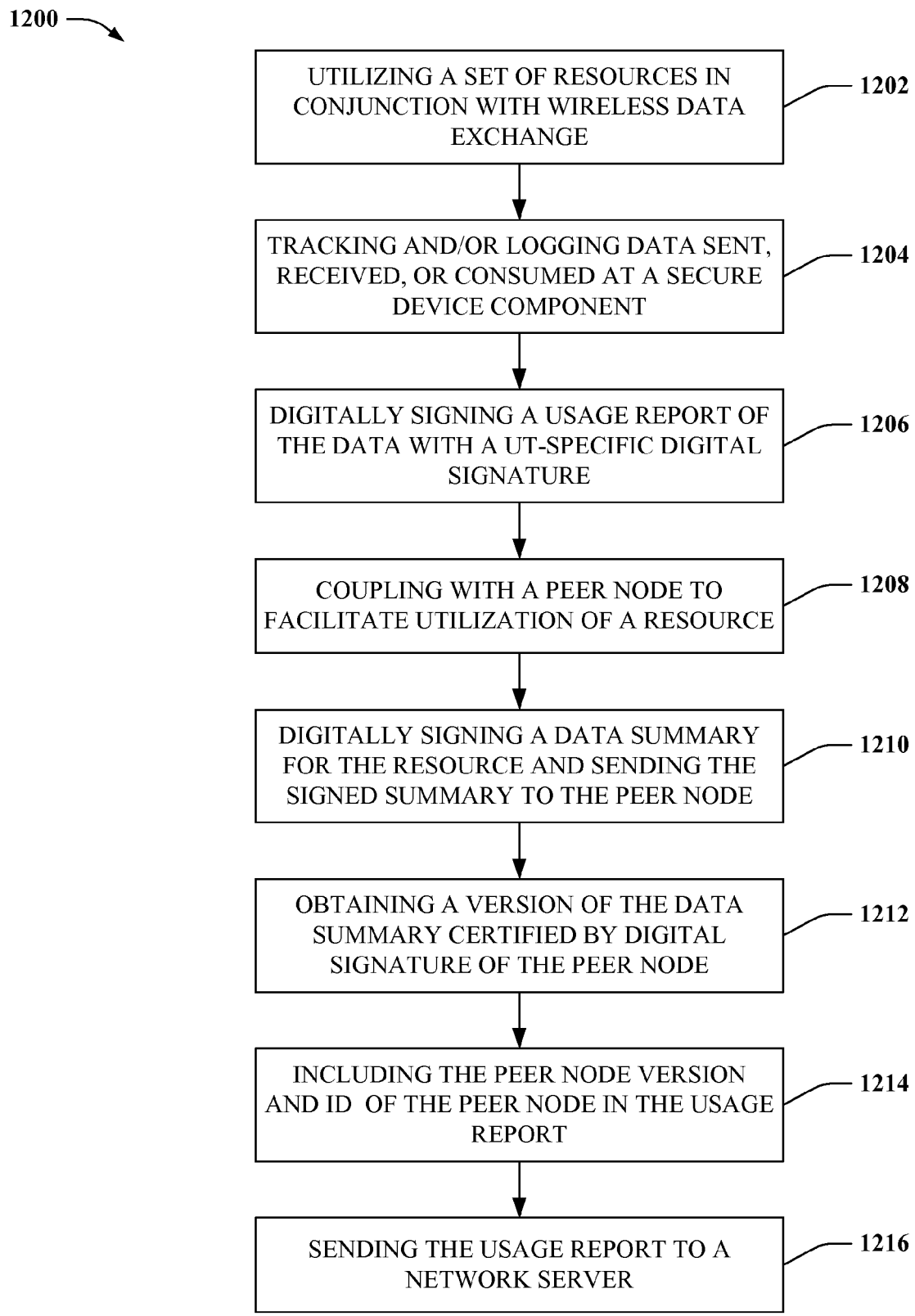
FIG. 12 depicts a flowchart of an example methodology for secure reporting of ad-hoc communication according to at least one aspect of the disclosure.

FIG. 11 illustrates a flowchart of an example methodology 1100 for securely tracking and reporting resources utilized in wireless communication. At 1102, method 1100 can utilize a set of resources in conjunction with wireless data exchange. The set of resources can comprise bandwidth of a wireless communication channel, such as a licensed spectrum. In other aspects, the set of resources can comprise data exchanged with one or more remote devices pertaining to the wireless data exchange. In further aspects, the set of resources can include media, communication and/or security applications employed for the wireless data exchange, level of QoS associated with the wireless data exchange, or the like. At 1104, method 1100 can transmit a report of resource usage; the report is certified with a UT-specific digital signature. Additionally, the report of resource usage can comprise information pertinent to the wireless data exchange, as described herein. At 1106, method 1100 can optionally obtain a confirmation of receipt of the usage report from a network server. As a further option, the confirmation of receipt can be digitally signed by the network server, or sent via a secure (encrypted) communication link FIG. 12 depicts a flowchart of an example methodology 1200 for secure reporting of ad-hoc communication according to at least one aspect of the disclosure. At 1202, method 1200 can utilize a set of resources in conjunction with wireless data exchange, as described herein. At 1204, method 1200 can track, or log data sent, received and/or consumed as part of the wireless data exchange, at a secure device component. At 1206, method 1200 can digitally sign a usage report of the data with a UT-specific digital signature. At 1208, method 1200 can couple with a peer node to facilitate utilization of a resource. Coupling with the peer node can comprise facilitating use of the resource for the peer node (e.g., acting as a relay), consuming data associated with the resource facilitated by the peer node, or utilizing the resource in communication with the peer node. At 1210, method 1200 can digitally sign a data summary of usage of the resource and send the signed summary to the peer node. At 1212, method 1200 can obtain a version of the data summary generated by the peer node and certified with a digital signature of the peer node. At 1214, method 1200 can include version of the data summary generated by the peer node in the usage report digitally signed at reference number 1206. At 1216, method 1200 can send the usage report to a network server to facilitate reporting an account of utilization of the resource.

Figure 13:
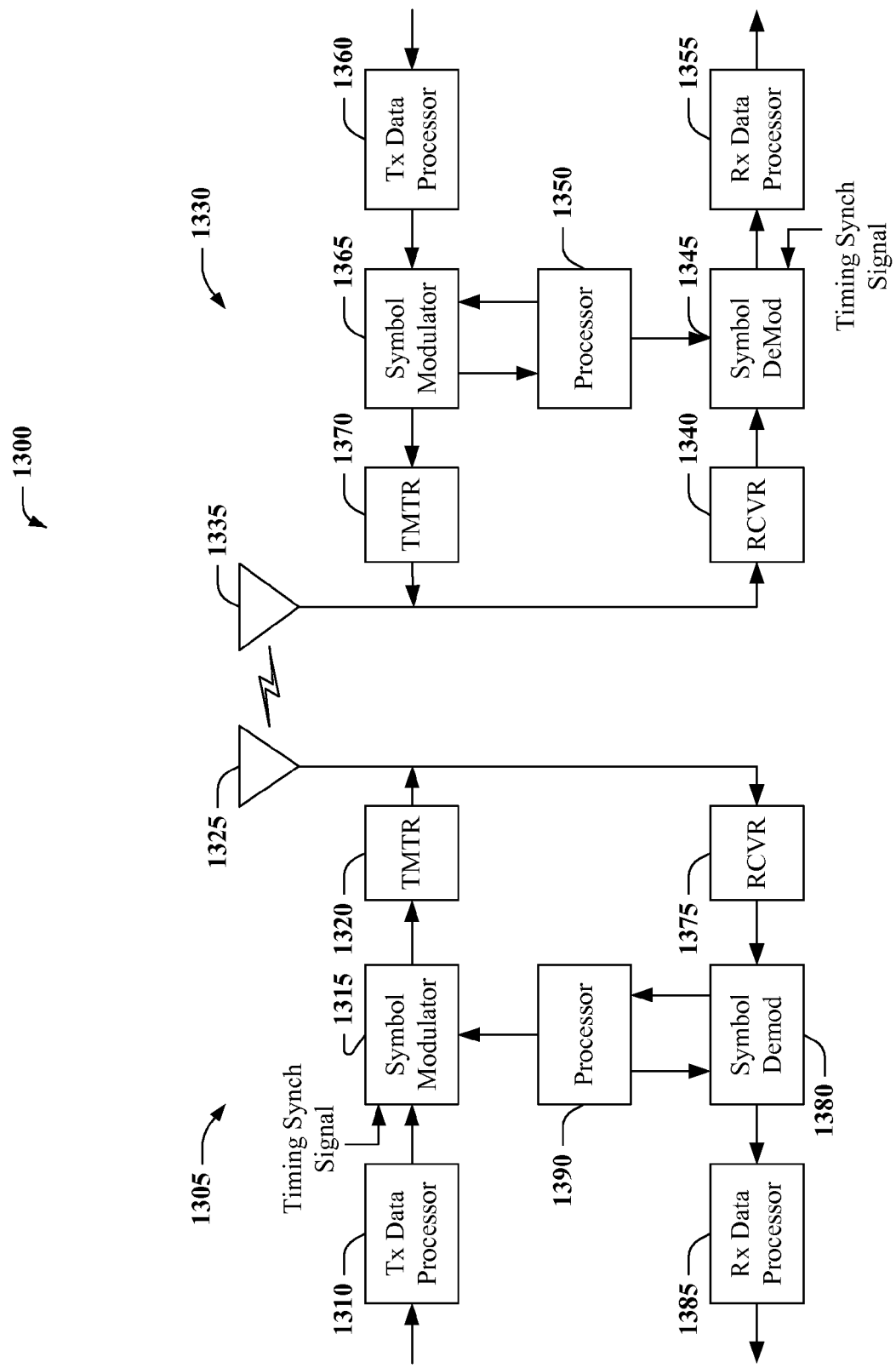
FIG. 13 illustrates a block diagram of an example system that provides wireless communication between devices according to aspects of the subject disclosure.

FIG. 13 depicts a block diagram of an example system 1300 that can facilitate ad-hoc wireless communication according to some aspects disclosed herein. Based on timing sequence of a synchronization timing signal (e.g., see FIG. 2, supra) obtained at a wireless terminal 1305, a transmit (TX) data processor 1310 receives, formats, codes, interleaves, and modulates (or symbol maps) traffic data and provides modulation symbols ("data symbols"). A symbol modulator 1315 receives and processes the data symbols and pilot symbols and provides a stream of symbols. A symbol modulator 1320 multiplexes data and pilot symbols and provides them to a transmitter unit (TMTR) 1320. Each transmit symbol can be a data symbol, a pilot symbol, or a signal value of zero.

TMTR 1320 receives and converts the stream of symbols into one or more analog signals and further conditions (e.g., amplifies, filters, and frequency upconverts) the analog signals to generate a transmit signal suitable for transmission over the wireless channel. The transmit signal is then transmitted through an antenna 1325 to a remote terminal(s) or other peer-to-peer partner. At wireless terminal 1330, also based on the timing sequence of the synchronization signal, an antenna 1335 receives the transmit signal sent by TMTR 1320 and provides a received signal to a receiver unit (RCVR) 1340. Receiver unit 1340 conditions (e.g., filters, amplifies, and frequency downconverts) the received signal and digitizes the conditioned signal to obtain samples. A symbol demodulator 1345 demodulates and provides received pilot symbols to a processor 1350 for channel estimation. Symbol demodulator 1345 further receives a frequency response estimate for the downlink from processor 1350, performs data demodulation on the received data symbols to obtain data symbol estimates (which are estimates of the transmitted data symbols), and provides the data symbol estimates to an RX data processor 1355, which demodulates (i.e., symbol demaps), deinterleaves, and decodes the data symbol estimates to recover the transmitted traffic data. The processing by symbol demodulator 1345 and RX data processor 1355 is complementary to the processing by symbol modulator 1315 and TX data processor 1310, respectively, at wireless terminal 1305.

On the wireless terminal 1330, a TX data processor 1360 processes traffic data and provides data symbols. A symbol modulator 1365 receives and multiplexes the data symbols with pilot symbols, performs modulation, and provides a stream of symbols. A transmitter unit 1370 then receives and processes the stream of symbols to generate a signal, which is transmitted by the antenna 1335 to the wireless terminal 1305.

At wireless terminal 1305, the uplink signal from terminal 1330 is received by the antenna 1325 and processed by a receiver unit 1375 to obtain samples. A symbol demodulator 1380 then processes the samples and provides received pilot symbols and data symbol estimates for the communication channel. An RX data processor 1385 processes the data symbol estimates to recover the traffic data transmitted by terminal 1330. A processor 1390 performs channel estimation for each active peer-to-peer partner transmitting on the communication channel. Multiple terminals can transmit pilots concurrently on peer-to-peer channels, or on their respective sets of peer-to-peer channel subbands, where peer-to-peer channel subband sets can be interlaced.

Processors 1390 and 1350 direct (e.g., control, coordinate, manage, etc.) operation at terminal 1305 and terminal 1330, respectively. Respective processors 1390 and 1350 can be associated with memory units (not shown) that store program codes and data. Processors 1390 and 1350 can also perform computations to derive frequency and impulse response estimates for the communication channel, respectively.

The techniques described herein can be implemented by various means. For example, these techniques can be implemented in hardware, software, or a combination thereof. For a hardware implementation, which can be digital, analog, or both digital and analog, the processing units used for channel estimation can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes can be stored in memory unit and executed by the processors 1390 and 1350.

Figure 14:
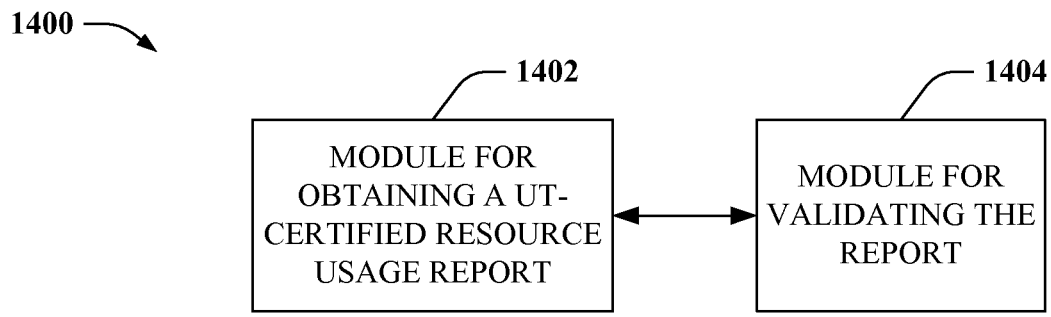
FIG. 14 depicts a block diagram of a sample system that verifies resource usage data submitted by a UT according to one or more aspects disclosed herein.

FIG. 14 depicts a block diagram of a sample system 1400 that verifies resource usage data submitted by a UT according to one or more aspects disclosed herein. System 1400 can comprise a means 1402 for obtaining a reported resource usage submitted by a UT. The reported resource usage can be obtained by means 1402 directly from the UT (e.g., employing a wired and/or wireless link with the UT), or indirectly from the UT (e.g., from a base station or one or more other UTs, acting as relays for the UT or that generate and submit the reported resource usage for the UT). In addition, the reported resource usage can be certified with a digital signature specific to the UT. System 1400 can additionally comprise a means 1404 for validating the reported usage. Validation can be accomplished utilizing a public key associated with the digital signature, or like mechanism by way of the context provided herein.

Figure 15:
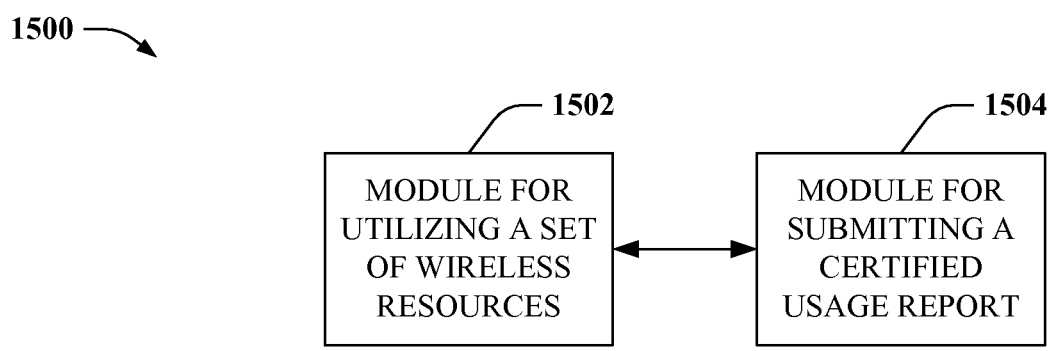
FIG. 15 depicts a block diagram of an example system that securely tracks and reports wireless resource usage according to further aspects.

FIG. 15 depicts a block diagram of an example system 1500 that securely tracks and reports wireless resource usage according to further aspects. System 1500 can comprise a means 1502 for utilizing a set of resources in conjunction with wireless data exchange, as described herein. The means 1502 can employ, for instance, a processing circuit, memory, transceiver and instructions for conducting the wireless data exchange. In addition, the means 1502 can be secured to limit access to information compiled as a result of the utilized resources. Furthermore, the system 1500 can comprise a means 1504 for transmitting a report of the resource usage. The report can be certified with a UT-specific digital signature associated with the system 1500. According to some aspects, the report can comprise information quantifying the resources utilized by a UT associated with system 1500. Furthermore, the UT-specific digital signature can be maintained in secure memory, which mitigates tampering, copying or otherwise unauthorized modification of the digital signature. Accordingly, system 1500 can provide a secure platform to track and compile usage reports of the utilized resources, as described herein.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" are used in either the detailed description or the claims, such terms are intended to be inclusive in a manner similar to the term "comprising" as "comprising" is interpreted when employed as a transitional word in a claim.

What is claimed is:

1. A method of accounting for wireless communications, comprising:
 receiving a reported resource usage submitted by a user terminal (UT), the reported resource usage including ad hoc wireless resources used by the UT and resources used by other UTs communicating in ad hoc mode with the UT over a direct wireless link and certified with a terminal-specific digital signature;
validating the reported usage;
identifying a subset of the reported usage that is pertinent to a peer node participating in peer-to-peer wireless data exchange with the UT, wherein the subset of the reported usage is signed with a terminal-specific digital signature of the peer node; and
verifying the subset of the reported usage using the terminal-specific digital signature of the peer node.

2. The method of claim 1, validating the reported usage further comprises:
verifying validity of a digital certificate associated with the terminal-specific digital signature of the UT by validating a certificate authority (CA) signature of the digital certificate;
verifying the terminal-specific digital signature of the UT with a public key obtained from the digital certificate; or
digitally authenticating the reported resource usage with a shared-secret key available to the UT and an authorized network entity.

3. The method of claim 1, further comprising identifying from the reported usage at least one of:
number of packets sent or received;
number of bytes sent or received;
a recipient or originator of data sent or received by the UT;
time of a wireless communication;
duration of a wireless communication; or
activation or duration of elevated quality of service (QoS) mechanisms, or a combination thereof.

4. The method of claim 1, further comprising:
obtaining an identifier of the UT with the reported usage;
verifying that the identifier is associated with the terminal-specific digital certificate of the UT; and
employing reported usage data and the public key to verify accuracy of the terminal-specific digital signature of the UT.

5. The method of claim 1, further comprising at least one of:
polling the UT for the reported usage; or
periodically receiving reported resource usage from the UT.

6. The method of claim 1, further comprising coupling with the peer node and obtaining a usage summary that is certified with the terminal-specific digital signature of the peer node.

7. The method of claim 1, further comprising coupling with the peer node, certifying a resource utilization summary with terminal-specific digital signature of the UT, and submitting the certified summary to the peer node.

8. The method of claim 1, further comprising:
obtaining an additional resource usage report, the additional usage report indicates a data exchange between the UT and a peer node;
quantifying the data exchange based on the additional usage report; and
comparing the quantified data exchange with a related quantity obtained from the reported usage.

9. The method of claim 8, validating the reported usage further comprises analyzing a result of the comparison.

10. The method of claim 1, further comprising identifying from the reported usage at least one of:
elevated QoS employed by the UT;
resource under-usage; or
substandard QoS for the UT.

11. The method of claim 10, further comprising reporting the elevated QoS, resource under-usage or substandard QoS to adjust account billing for the reported usage.

12. An apparatus that provides accounting for wireless communications, comprising:
a communication interface that obtains a reported resource usage submitted by a UT, the reported resource usage including ad hoc wireless resources used by the UT and resources used by other UTs communicating in ad hoc mode with the UT over a direct wireless link and certified with a terminal-specific digital signature; and
a processing circuit that:
validates the reported usage;
identifies a subset of the reported usage that is pertinent to a peer node participating in peer-to-peer wireless data exchange with the UT, the subset of the reported usage being signed with a terminal-specific digital signature of the peer node; and
verifies the subset of the reported usage using the terminal-specific digital signature of the peer node.

13. The apparatus of claim 12, the processing circuit verifies authenticity of the certified reported usage by:
verifying validity of a digital certificate associated with the terminal-specific digital signature of the UT by validating a CA signature on the digital certificate;
verifying the terminal-specific digital signature of the UT with a public key obtained from the digital certificate; or
authenticating the terminal-specific digital signature with a shared-secret key stored at the terminal and at an authorized network entity.

14. The apparatus of claim 12, further comprising a data parser that extracts from the reported usage at least one of:
a number of packets sent or received;
a number of bytes sent or received;
a recipient or originator of data sent or received by the UT;
time of a wireless communication;
duration of a wireless communication; or
activation or duration of elevated QoS mechanisms, or a combination thereof.

15. The apparatus of claim 14, further comprising a reporting module that submits a usage report for the UT based on information extracted by the data parser.

16. The apparatus of claim 15, the data parser further extracts from the reported usage substandard QoS or resource under-usage, which is submitted with the usage report by the reporting module.

17. The apparatus of claim 12, further comprising memory that stores a list of authorized UTs and associated identifiers and public keys, wherein the processing circuit:
obtains an identifier of the UT from the reported usage;
employs the identifier to obtain a public key associated with the UT stored in the memory; and
employs the public key and usage data included in the reported usage to verify accuracy of the terminal-specific digital signature of the UT.

18. The apparatus of claim 12, further comprising at least one of:
an acquisition module that polls the UT for the reported usage; or
a timing module that periodically scans received communication for the reported resource usage.

19. The apparatus of claim 12, the processing circuit further coupling with the peer node and obtaining a usage summary that is certified with the terminal-specific digital signature of the peer node.

20. The apparatus of claim 12, the processing circuit further coupling with the peer node, certifying a resource utilization summary with terminal-specific digital signature of the UT, and submitting the certified summary to the peer node.

21. The apparatus of claim 12, wherein:
the communication interface obtains an additional resource usage report that indicates a data exchange between the UT and a peer node;
a data parser quantifies the data exchange based on the additional usage report; and
the processing circuit compares the quantified data exchange with a related quantity obtained from the reported usage.

22. The apparatus of claim 21, the processing circuit validates the reported usage based at least in part on a result of the comparison.

23. An apparatus that accounts for wireless communications, comprising:
means for obtaining a reported resource usage submitted by a UT, the reported resource usage including ad hoc wireless resources used by the UT and resources used by other UTs communicating in ad hoc mode with the UT over a direct wireless link and certified with a terminal-specific digital signature;
means for validating the reported usage;
means for identifying a subset of the reported usage that is pertinent to a peer node participating in peer-to-peer wireless data exchange with the UT, wherein the subset of the reported usage is signed with a terminal-specific digital signature of the peer node; and
means for verifying the subset of the reported usage using the terminal-specific digital signature of the peer node.

24. A processor configured to account for wireless communications, comprising:
a first module for obtaining a reported resource usage submitted by a UT, the reported resource usage including ad hoc wireless resources used by the UT and resources used by other UTs communicating in ad hoc mode with the UT over a direct wireless link and certified with a terminal-specific digital signature;
a second module for validating the reported usage;
a third module for identifying a subset of the reported usage that is pertinent to a peer node participating in peer-to-peer wireless data exchange with the UT, wherein the subset of the reported usage is signed with a terminal-specific digital signature of the peer node; and
a fourth module for verifying the subset of the reported usage using the terminal-specific digital signature of the peer node.

25. A computer program product, comprising:
a non-transitory computer-readable medium, comprising:
a first set of codes for causing a computer to obtain a reported resource usage submitted by a UT, the reported resource usage including ad hoc wireless resources used by the UT and resources used by other UTs communicating in ad hoc mode with the UT over a direct wireless link and certified with a terminal-specific digital signature;
a second set of codes for causing the computer to validate the reported usage;
a third set of codes for identifying a subset of the reported usage that is pertinent to a peer node participating in peer-to-peer wireless data exchange with the UT, wherein the subset of the reported usage is signed with a terminal-specific digital signature of the peer node; and
a fourth set of codes for verifying the subset of the reported usage using the terminal-specific digital signature of the peer node.

26. A method of accounting for remote communications, comprising:
utilizing a set of resources in conjunction with wireless data exchange in a UT;
transmitting a report of resource usage, the report including ad hoc wireless resources used by the UT and resources used by other UTs communicating in ad hoc mode with the UT over a direct wireless link and certified with a UT-specific digital signature;
identifying a subset of the reported usage that is pertinent to a peer node participating in peer-to-peer wireless data exchange with the UT; and
verifying the subset of the reported usage using a terminal-specific digital signature of the peer node.

27. The method of claim 26, further comprising logging usage of the set of resources and including a subset of the usage log in the report.

28. The method of claim 26, further comprising sending, receiving or consuming data pertaining to the set of resources and including an amount of the data in the report.

29. The method of claim 26, further comprising specifying in the report at least one of:
a number of packets sent, received or consumed for a resource of the set;
a number of bytes sent, received or consumed for the resource;
an ID of a UT consuming data provided by the resource;
an ID of a peer node facilitating utilization of the resource;
time of initiating or terminating the resource;
duration of utilization of the resource;
a public key associated with the UT-specific digital certificate; or
QoS level associated with the resource.

30. The method of claim 26, further comprising employing a secure interface, processing module, or memory to track, compile, or digitally sign the report.

31. The method of claim 30, further comprising at least one of:
preventing access to the secure processing module or secure memory; or
preventing output of the report from the secure interface or secure memory if the report is not certified with the digital signature.

32. The method of claim 26, further comprising coupling with the peer node in conjunction with utilizing a resource of the set and identifying the peer node in the report.

33. The method of claim 32, further comprising at least one of:
obtaining a usage summary of the resource that is certified with a digital signature of the peer node; or
certifying a resource utilization summary with the UT-specific digital signature and submitting the certified summary to the peer node.

34. The method of claim 26, the report is further certified, at least in part, with the terminal-specific digital signature of the peer node.

35. The method of claim 26, further comprising:
obtaining a biometric identifier of a user of a UT; and
allowing or denying access to a resource of the set based on the biometric identifier.

36. The method of claim 35, further comprising submitting the biometric identifier with the report in conjunction with allowing access to the resource.

37. A user terminal (UT) configured to account for remote communications, comprising:
a processing circuit that utilizes a set of resources in conjunction with wireless data exchange;
an accounting module that compiles and transmits a report of resource usage, the report including ad hoc wireless resources used by the UT and resources used by other UTs communicating in ad hoc mode with the UT over a direct wireless link and certified with a digital signature specific to the UT; and memory that stores a digital certificate associated with the digital signature, wherein the processing circuit further identifies a subset of the reported usage that is pertinent to a peer node participating in peer-to-peer wireless data exchange with the UT, and verifies the subset of the reported usage using a terminal-specific digital signature of the peer node.

38. The UT of claim 37, further comprising a data tracking module that logs usage of the set of resources and provides a subset of the usage log for inclusion in the report.

39. The UT of claim 37, wherein:
the processing circuit consumes data pertaining to the set of resources, or facilitates consumption of such data for a second UT; and
the accounting module includes an amount of consumed data in the report.

40. The UT of claim 37, the accounting module specifies in the report at least one of:
a number of packets sent, received or consumed;
a number of bytes sent, received or consumed;
an ID of the UT;
an ID of a peer node participating in utilization of a resource;
time of initiating or terminating the resource;
duration of utilization of the resource;
a public key associated with the UT-specific digital certificate; or
QoS level associated with the resource.

41. The UT of claim 37, further comprising a secure interface that prevents or mitigates access to the processing circuit, memory or accounting module.

42. The UT of claim 41, the secure interface prevents transmission of the report from the accounting module until the report is certified by the digital signature.

43. The UT of claim 37, wherein:
the processing circuit employs a wireless communication interface to communicatively couple with the peer node in conjunction with utilizing a resource; and
the accounting module identifies in the report the peer node and a number of data packets or bytes exchanged between the UT and the peer node.

44. The UT of claim 43, wherein at least one of:
the processing circuit obtains a usage summary of the resource that is certified with a digital signature of the peer node; or
the accounting module certifies a resource utilization summary with the UT-specific digital signature and submits the certified summary to the peer node.

45. The UT of claim 37, the report is further certified, at least in part, with the terminal-specific digital signature of the peer node.

46. The UT of claim 37, further comprising a biometric scanner that obtains a biometric identifier of a user of the UT, the processing circuit allows or denies access to a resource based on the biometric identifier.

47. The UT of claim 46, the accounting module submits the biometric identifier with the report if the processing circuit allows access to the resource.

48. An apparatus configured to account for remote communications, comprising:
means for utilizing a set of resources in conjunction with wireless data exchange in a UT;
means for transmitting a report of resource usage, the report including ad hoc wireless resources used by the UT and resources used by other UTs communicating in ad hoc mode with the UT over a direct wireless link and certified with a UT-specific digital signature;
means for identifying a subset of the reported usage that is pertinent to a peer node participating in peer-to-peer wireless data exchange with the UT; and
means for verifying the subset of the reported usage using a terminal-specific digital signature of the peer node.

49. A processor configured to account for remote communication, comprising:
a first module for utilizing a set of resources in conjunction with wireless data exchange in a UT;
a second module for transmitting a report of resource usage, the report including ad hoc wireless resources used by the UT and resources used by other UTs communicating in ad hoc mode with the UT over a direct wireless link and certified with a UT-specific digital signature;
a third module for identifying a subset of the reported usage that is pertinent to a peer node participating in peer-to-peer wireless data exchange with the UT; and
a fourth module for verifying the subset of the reported usage using a terminal-specific digital signature of the peer node.

50. A computer program product, comprising:
a non-transitory computer-readable medium, comprising:
a first set of codes for causing a computer to utilize a set of resources in conjunction with wireless data exchange in a UT; and
a second set of codes for causing the computer to transmit a report of resource usage, the report including ad hoc wireless resources used by the UT and resources used by other UTs communicating in ad hoc mode with the UT over a direct wireless link and certified with a UT-specific digital signature;
a third set of codes for identifying a subset of the reported usage that is pertinent to a peer node participating in peer-to-peer wireless data exchange with the UT;
a fourth set of codes for verifying the subset of the reported usage using a terminal-specific digital signature of the peer node.

* * * * *